US008155317B2

(12) United States Patent
Motoyama

(10) Patent No.: US 8,155,317 B2
(45) Date of Patent: Apr. 10, 2012

(54) ENCRYPTION PROCESSING CIRCUIT AND ENCRYPTION PROCESSING METHOD

(75) Inventor: Masahiko Motoyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 926 days.

(21) Appl. No.: 11/934,345

(22) Filed: Nov. 2, 2007

(65) Prior Publication Data
US 2008/0212776 A1 Sep. 4, 2008

(30) Foreign Application Priority Data

Nov. 7, 2006 (JP) ................................. 2006-302064

(51) Int. Cl.
H04K 1/02 (2006.01)
(52) U.S. Cl. ........................................ 380/252; 713/168
(58) Field of Classification Search .......... 380/259–266, 380/29, 42, 43, 36, 37
See application file for complete search history.

(56) References Cited

U.S. PATENT DOCUMENTS

| 3,564,514 | A | | 2/1971 | Gunderson |
| 3,593,317 | A | | 7/1971 | Fleisher |
| 3,812,467 | A | | 5/1974 | Batcher |
| 4,233,667 | A | | 11/1980 | Devine et al. |
| 4,336,601 | A | | 6/1982 | Tanaka |
| 4,569,052 | A | * | 2/1986 | Cohn et al. .................... 714/763 |
| 4,620,188 | A | | 10/1986 | Sengchanh |
| 4,663,500 | A | * | 5/1987 | Okamoto et al. ............... 380/47 |
| 4,727,268 | A | | 2/1988 | Hori |
| 4,802,217 | A | * | 1/1989 | Michener ........................ 380/29 |
| 5,256,918 | A | | 10/1993 | Suzuki |
| 5,619,576 | A | * | 4/1997 | Shaw ............................... 380/44 |
| 5,623,548 | A | * | 4/1997 | Akiyama et al. ................ 380/28 |
| 5,768,390 | A | * | 6/1998 | Coppersmith et al. .......... 380/42 |
| 6,066,965 | A | | 5/2000 | Blomgren et al. |
| 6,208,166 | B1 | | 3/2001 | Carro |
| 6,510,518 | B1 | * | 1/2003 | Jaffe et al. ..................... 713/168 |
| 6,654,884 | B2 | | 11/2003 | Jaffe et al. |

(Continued)

FOREIGN PATENT DOCUMENTS

JP 2003-223100 A 8/2003
JP 2005-031471 A 2/2005

OTHER PUBLICATIONS

Tian, Chao. "A Coding Algorithm for Constant Weight Vectors: A Geometric Approach Based on Dissections," IEEE Transactions on Information Theory, vol. 55, No. 3, Mar. 2009.*

(Continued)

Primary Examiner — Kambiz Zand
Assistant Examiner — Dant Shaifer Harriman
(74) Attorney, Agent, or Firm — Foley & Lardner LLP

(57) ABSTRACT

An encryption processing circuit includes: a decoder configured to convert a binary input data used for predetermined encryption computing into a first plurality of bit data of a constant hamming weight independently of a hamming weight of the input data; a wiring network configured to receive the first plurality of bit data converted by the decoder, the wiring network further configured, for the purpose of the predetermined encryption computing, to change a bit pattern of the received first plurality of bit data by replacing bit positions of the first plurality of bit data, and to generate a second plurality of bit data; and an encoder configured to convert the second plurality of bit data generated in the wiring network into a binary output data.

3 Claims, 26 Drawing Sheets

U.S. PATENT DOCUMENTS

| | | | |
|---|---|---|---|
| 7,050,581 | B1 | 5/2006 | Goubin et al. |
| 7,071,725 | B2 | 7/2006 | Fujisaki |
| 7,583,207 | B2 | 9/2009 | Motoyama |
| 2003/0093684 | A1 | 5/2003 | Kaiserswerth et al. |
| 2003/0198343 | A1 | 10/2003 | Morioka et al. |
| 2004/0030905 | A1 | 2/2004 | Chow et al. |
| 2005/0036608 | A1 | 2/2005 | Launchbury et al. |
| 2005/0273630 | A1 | 12/2005 | Shu et al. |
| 2007/0055868 | A1 | 3/2007 | Brier et al. |
| 2008/0183793 | A1 | 7/2008 | Motoyama |

OTHER PUBLICATIONS

U.S. Appl. No. 11/872,387, filed Oct. 15, 2007, Motoyama.

U.S. Appl. No. 12/019,250, filed Jan. 24, 2008, Motoyama.

M. Motoyama, U.S. PTO Notice of Allowance; U.S. Appl. No. 11/872,387, Apr. 17, 2009; 8 pages.

M. Motoyama, U.S. PTO Office Action, U.S. Appl. No. 11/872,387, Sep. 23, 2008, 7 pages.

S. Moore et a., "Improving Smart Card Security Using Self-timed Circuits," Proceedings Eighth International Symposium on Asynchronous Circuits and Systems, Apr. 8-11, 2002, pp. 211-218.

Minoru Sasaki et al., "Verification of MRSL based S-BOX in AES as a countermeasure against DPA", The Institute of Electronics, Information and Communication Engineers, IEICE Technical Report No. ISBC2006-77, Sep. 2006, pp. 37-44.

M. Motoyama, U.S. PTO Notice of Allowance, U.S. Appl. No. 12/019,250, dated Feb. 2, 2012, 19 pages.

* cited by examiner

FIG.4

|      | 0  | 1  | 2  | 3 | 4  | 5  | 6  | 7  | 8  | 9  | 10 | 11 | 12 | 13 | 14 | 15 |
|------|----|----|----|---|----|----|----|----|----|----|----|----|----|----|----|----|
| S1-0 | 14 | 4  | 13 | 1 | 2  | 15 | 11 | 8  | 3  | 10 | 6  | 12 | 5  | 0  | 0  | 7  |
| S1-1 | 0  | 15 | 7  | 4 | 14 | 2  | 13 | 1  | 10 | 6  | 12 | 11 | 9  | 5  | 3  | 8  |
| S1-2 | 4  | 1  | 14 | 8 | 13 | 6  | 2  | 11 | 15 | 12 | 9  | 7  | 3  | 10 | 5  | 0  |
| S1-3 | 15 | 12 | 8  | 2 | 4  | 9  | 1  | 7  | 5  | 11 | 3  | 14 | 10 | 0  | 6  | 13 |

FIG.13

| INPUT 1 | INPUT 2 | OUTPUT |
|---|---|---|
| 0 | 0 | 0 |
| 0 | 1 | 1 |
| 1 | 0 | 1 |
| 1 | 1 | 0 |

FIG.14

| INPUT | | OUTPUT | |
|---|---|---|---|
| 000 | 0 | 001 | 1 |
| 001 | 1 | 000 | 0 |
| 010 | 2 | 011 | 3 |
| 011 | 3 | 010 | 2 |
| 100 | 4 | 101 | 5 |
| 101 | 5 | 100 | 4 |
| 110 | 6 | 111 | 7 |
| 111 | 7 | 110 | 6 |

ENCRYPTION PROCESSING CIRCUIT AND ENCRYPTION PROCESSING METHOD

CROSS REFERENCE TO RELATED APPLICATION

This application is based upon and claims the benefit of priority from the prior Japanese Patent Application No. 2006-302064 filed on Nov. 7, 2006; the entire contents of which are incorporated herein by this reference.

BACKGROUND OF THE INVENTION

1. Field of the Invention

The present invention relates to an encryption processing circuit and an encryption processing method.

2. Description of the Related Art

Conventionally, encryption processing techniques for protecting secret information have been widely used. Also, the encryption processing technique may be realized by hardware.

For example, when the nonlinear conversion processing in the S-Box of DES (Data Encryption Standard) which is one of the encryption schemes is realized by hardware, the processing circuit is realized by using a memory such as a ROM or by combining various circuits. Note that the processing in the S-Box is processing for converting input data into another data in one-to-one correspondence.

On the other hand, as one of the encryption analysis techniques, there is a technique referred to as power analysis for stealing secret data by observing the power consumption in hardware which performs encryption processing. When secret data is correlated with electric power consumed in a hardware circuit at the time of processing secret data, the secret data used in encryption processing may be stolen by a so-called power analysis attack using the technique. Therefore, in recent years, as disclosed, for example, in Japanese Patent Laid-Open No. 2005-31471, there have been proposed various techniques relating to measures against the power analysis attack.

When an encryption processing circuit is configured by a combinational circuit, the combinational circuit is generally generated in many cases by using a technique, such as automatic logic synthesis processing.

However, when the automatic logic synthesis processing technique is used, it is difficult to predict what circuit is generated, and it is also difficult to improve the synthesized circuit in many cases. Therefore, it is not possible to eliminate the possibility that in the generated combinational circuit, the power consumption at the time of processing secret data is correlated with the secret data. Even if such correlation exists, it is difficult to eliminate the correlation by improving the circuit.

Note that, as disclosed, for example, in Japanese Patent Laid-Open No. 2003-223100, there is proposed a technique capable of improving the circuit generated by the automatic logic synthesis processing. However, the technique has a problem that the circuit scale is enlarged.

SUMMARY OF THE INVENTION

According to an aspect of the present invention, there is provided an encryption processing circuit configured to perform predetermined encryption computing, including: a decoder configured to convert a binary input data used for the predetermined encryption computing into a first plurality of bit data of a constant hamming weight independently of a hamming weight of the input data; a wiring network connected to the decoder and configured to receive the first plurality of bit data converted by the decoder, the wiring network further configured, for the purpose of the predetermined encryption computing, to change a bit pattern of the received first plurality of bit data by replacing bit positions of the first plurality of bit data, and to generate a second plurality of bit data; and an encoder connected to the wiring network and configured to convert the second plurality of bit data generated in the wiring network into a binary output data.

According to one aspect of the present invention, there is provided an encryption processing method configured to perform predetermined encryption computing, including: converting a binary input data used for the predetermined encryption computing into a first plurality of bit data of a constant hamming weight independently of a hamming weight of the input data; receiving the converted first plurality of bit data and changing, for the purpose of the predetermined encryption computing, a bit pattern of the received first plurality of bit data by replacing bit positions of the first plurality of bit data, to generate a second plurality of bit data; and converting the generated second plurality of bit data into a binary output data.

According to one aspect of the present invention, there is provided an encryption processing circuit configured to perform predetermined encryption computing, including: a decoder used for the predetermined encryption computing and configured to convert a binary input data subjected to data masking based on a first mask data into a first plurality of bit data of a constant hamming weight independently of a hamming weight of the input data; a mask removing section connected to the decoder and configured to perform removing processing of the first mask data to the first plurality of bit data output by the decoder; a wiring network connected to the mask removing section and configured to receive the first plurality of bit data subjected to the mask removing processing by the mask removing section, the wiring network further configured, for the purpose of the predetermined encryption computing, to change a bit pattern of the received first plurality of bit data subjected to the mask removing processing by replacing bit positions of the first plurality of bit data subjected to the mask removing processing, and to generate a change bit data; a mask adding section connected to the wiring network and configured to generate a second plurality of bit data by performing second mask data adding processing to the change bit data by using the second mask data; and an encoder connected to the mask adding section and configured to convert the second plurality of bit data into a binary output data.

According to one aspect of the present invention, there is provided an encryption processing method configured to perform predetermined encryption computing, including: performing removing processing of a first mask data to a decoder used for the predetermined encryption computing and configured to convert a binary input data subjected to data masking based on the first mask data into a first plurality of bit data of a constant hamming weight independently of a hamming weight of the input data, and the removing processing of the first mask data to the converted first plurality of bit data; receiving the first plurality of bit data subjected to the mask removing processing, and changing, for the purpose of the predetermined encryption computing, a bit pattern of the received first plurality of bit data subjected to the mask removing processing by replacing bit positions of the first plurality of bit data subjected to the mask removing processing, to generate a change bit data; and generating a plurality of second bit data by performing second mask data adding processing to the change bit data by using the second master data, to convert the plurality of second bit data into a binary output data.

BRIEF DESCRIPTION OF THE DRAWINGS

FIG. 4 is a figure showing a table representing the contents of the conversion processing in the circuit S1 of DES according to the first embodiment of the present invention;

FIG. 13 is a figure showing a truth table of exclusive OR according to the second embodiment of the present invention;

FIG. 14 is a figure showing a table representing a relation between input values and output values in the case of exclusive OR using a master data of 001 according to the second embodiment of the present invention;

DETAILED DESCRIPTION OF THE PREFERRED EMBODIMENTS

In the following, embodiments according to the present invention will be described with reference to the accompanying drawings.

First Embodiment

Figure 1:
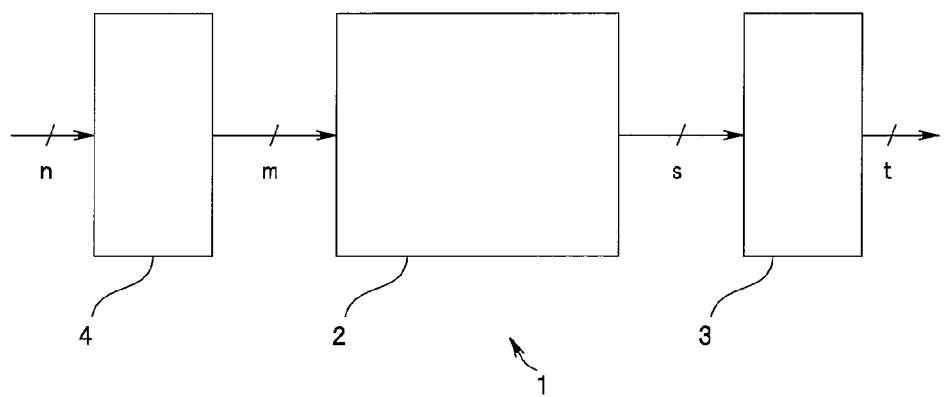
FIG. 1 is a block diagram showing a configuration of an encryption processing circuit according a first embodiment of the present invention.

First, with reference to FIG. 1, there is described an entire configuration of an encryption processing circuit according to a first embodiment of the present invention. FIG. 1 is a block diagram showing a configuration of the encryption processing circuit according to the first embodiment.

FIG. 1 shows a basic configuration applicable to various kinds of encryption processing circuits, and shows an encryption processing circuit 1 configured by including a wiring network section (hereinafter referred to as "wiring network") 2, an encoding section (hereinafter referred to as "encoder") 3, and a decoding section (hereinafter referred to as "decoder") 4. The decoder 4 is a decoder configured to convert an n-bit binary data into a bit string of m bits (m>n). The wiring network 2 is a wiring network circuit configured to perform a predetermined encryption computing by replacing bits of the decoded data. The encoder 3 is an encoder configured to convert an s-bit data output from the wiring network 2 into a t-bit data (s>t).

Here, the input data used for the predetermined encryption computing is an n-bit data. However, when decoded, the input data is converted into an m-bit data, which is longer than the n-bit data, and hence the redundancy is increased. Further, the decoded data is a plurality of bit data which has a hamming weight independent of the hamming weight of the input n-bit binary data, and is subsequently processed. For example, when m is set to 2 to the power of n, the input data is converted into a data in which only one signal of the m-bit data is set to HIGH (hereinafter also referred to as "H"). When such conversion is performed, after the decoding, only one wiring is continuously set to H, so that the hamming weight is fixed at all times. Therefore, the power consumption of the encryption processing circuit 1 is not dependent on the input data, and hence it is possible to realize an encryption processing circuit having resistance to a so-called power analysis attack.

In the following, exemplary embodiments according to the present invention will be described with reference to accompanying drawings.

Figure 2:
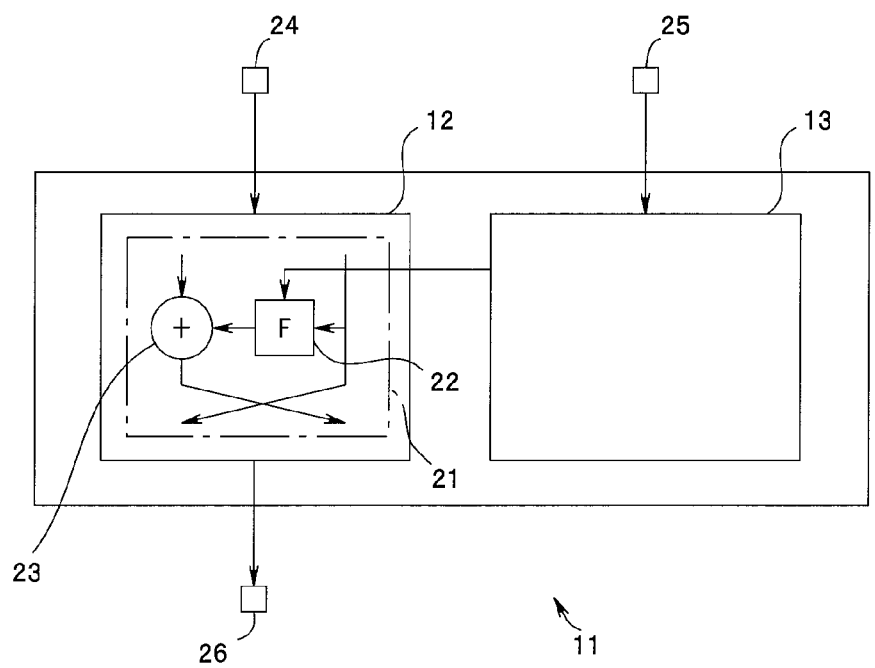
FIG. 2 is a block diagram showing an entire configuration of an encryption processing circuit for performing processing of a DES which is one of encryption algorithms according to the first embodiment of the present invention.

FIG. 2 is a block diagram showing an entire configuration of an encryption processing circuit configured to perform the encryption processing of DES which is one of encryption algorithms. In FIG. 2, the configuration of the encryption processing circuit shown in FIG. 1 is applied to the inside of an f function section as will be described below. Also, each S-Box in the f function section has the configuration of the encryption processing circuit shown in FIG. 1.

The encryption processing circuit 1 is mounted in an IC card or the like, and is used for encryption processing and decoding processing corresponding to the encryption processing. For example, plaintext data (hereinafter also referred to as "plaintext") PT and key data (hereinafter also referred to as "key") K which is secret information are input into an encryption circuit module 11 mounted in the IC card. The encryption circuit module 11 includes a scramble section 12 and a key schedule section 13.

The scramble section 12 includes a round function section 21, and further includes an initial transposition circuit and a final transposition circuit (both not shown). The round function section 21 further includes an f function section 22 and an exclusive OR section 23. A 64-bit plaintext PT is input into the scramble section 12 from an input terminal 24. The key schedule section 13 includes a transposition circuit and a contraction type transposition circuit (both not shown). A 56-bit key K is input into the key schedule section 13 from an input terminal 25.

The plaintext PT is divided into two 32-bit data by the initial transposition circuit. One of the two 32-bit data is input into the f function section 22, and the other is input into the exclusive OR section 23.

On the other hand, the key data K is input into the key schedule section 13, and is divided into two 28-bit data by the transposition circuit. Thereafter, each of the two data is subjected to shift processing by a shifting circuit, and is further subjected to bit selection by the contraction type transposition circuit, so that an expanded key data (hereinafter also referred to as "expanded key") is generated. The generated expanded key is input into the f function section 22 of the round function section 21. Note that the key data is read, for example, from an EEPROM of the IC card, and is input into the key schedule section 3 via an internal bus.

The round function section 21 makes the f function section 22 perform function processing by using the one data of the plaintext PT and the expanded key, and further makes the exclusive OR section 23 take an exclusive OR between the output of the f function section and the other data of the plaintext PT. Then, the round function section 21 makes one of the two 32-bit data generated as it is as a first output, and makes the output of the exclusive OR section 23 generated as a second output.

That is, the scramble section 12 generates two 32-bit outputs from two 32-bit inputs, while the key schedule section 13 generates two 28-bit outputs from two 28-bit inputs.

In the DES algorithm, the scramble section 12 repeats 16 times the round processing in which a 64-bit data is divided into two data, and in which one of the two data is input into the f function section 22 and an exclusive OR between the output of the f function section 22 and the other of the two data is taken. In the next round, the two outputs are exchanged and again input into the round function section 21. Further, in the key schedule section 13, sixteen 48-bit expanded keys are generated from the 56-bit data and are input into the f function section 22 in each round. Eventually, the generated encrypted text is output from an output terminal 26.

The f function section 22 includes S-Boxes configured to perform nonlinear conversion processing. Each S-Box has a 6-bit input and a 4-bit output. The f function section 22 includes eight S-Boxes (from S1 to S8) each configured to perform random nonlinear conversion processing.

Figure 3:
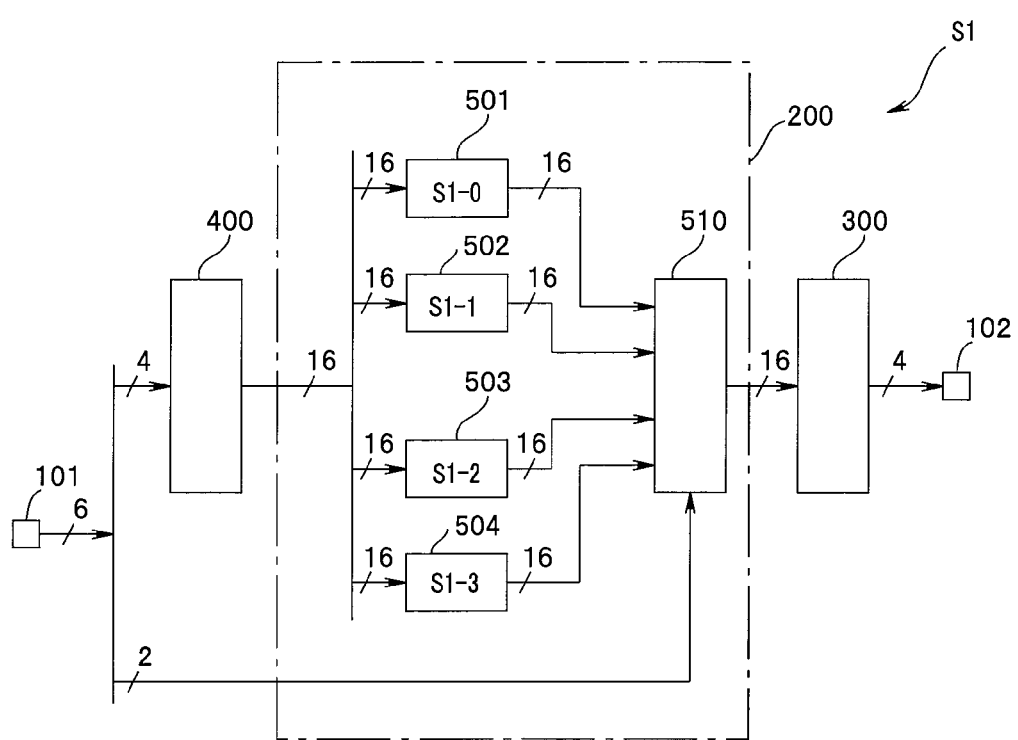
FIG. 3 is a block diagram showing an example of a circuit configuration for realizing nonlinear conversion according to the first embodiment of the present invention.

FIG. 3 is a block diagram showing an example of a circuit configuration for realizing nonlinear conversion referred to as S1 which is one of the circuits in the S-Box of the f function section 22 of DES which is one of encryption algorithms.

The circuit S1 has an input terminal section 101 for receiving a 6-bit data, and an output terminal section 102 for outputting a 4-bit data. The circuit S1 is configured by including a wiring network section 200, an encoder 300 and a decoder 400.

The wiring network section 200 includes sub-wiring network sections 501 to 504 and a selecting section 510. The sub-wiring networks 501 to 504 respectively correspond to circuits S1-0, S1-1, S1-2 and S1-3, each having a 16-bit input and a 16-bit output. As will be described below, the circuits S1-0, S1-1, S1-2 and S1-3 are respectively configured so as to replace an output of a plurality of bit data from the decoder 400 with a predetermined output.

Each of the outputs of the sub-wiring networks 501 to 504 is connected to the selecting section 510. The selecting section 510 selects one of the inputs from the sub-wiring networks 501 to 504, on the basis of two bits of the input data from the input terminal 101 as a control signal, and outputs the selected input to the encoder 300. It is assumed that the selecting section 510 selects the sub-wiring network 501 (S1-0) for the input data (A5, A0)=(0, 0), the sub-wiring network 502 (S1-1) for input data (A5, A0)=(0, 1), the sub-wiring network 503 (S1-2) for input data (A5, A0)=(1, 0), and the sub-wiring network 504 (S1-3) for input data (A5, A0)= (1, 1).

The encoder 300 encodes the 16-bit data output from the selecting section 510 to a 4-bit data, and outputs the 4-bit data to the output terminal section 102.

The decoder 400 decodes 4 bits in a 6-bit data input into the input terminal 101 to a 16-bit data, and outputs the 16-bit data to each of the wiring networks 501 to 504. The decoder 400 converts the input 4-bit data into the 16-bit data in such a manner that one of the values expressed by the 4-bit data (one of 16 values) is specified by setting one of the 16 outputs to 1.

The contents of conversion processing in the circuit S1 of DES are defined by a table shown in FIG. 4. FIG. 4 shows the table showing the contents of conversion processing in the circuit S1 of DES. In other words, the circuits S1-0, S1-1, S1-2 and S1-3 are conversion processing sections configured to convert an input data into a predetermined random output data. In the circuit S1 of FIG. 3, a 6-bit data (A5, A4 to A1, A0) is input, and the circuit S1 outputs a 4-bit data (B3, B2, B1, B0). The values of 4 bits A1 to A4 specify the column of the table in FIG. 4, and the values of 2 bits of A0 and A5 specify the row of the table. Specifically, S1-0 is selected at the time of (A5, A0)=(0, 0), S1-1 is selected at the time of (A5, A0)=(0, 1), S1-2 is selected at the time of (A5, A0)=(1, 0), and S1-3 is selected at the time of (A5, A0)=(1, 1). Further, the column 0 is selected at the time of (A4, A3, A2, A1)=(0, 0, 0, 0), and the column 1 is selected at the time of (A4, A3, A2, A1)=(0, 0, 0, 1). Similarly, a predetermined column is selected for a 4-bit input data, and the column 15 is selected at the time of (A4, A3, A2, A1)=(1, 1, 1, 1). The circuits S2 to S8 have the same configuration as that of FIG. 3, and perform the conversion processing defined by the same table (not shown) as that shown in FIG. 4, respectively.

Figure 5:
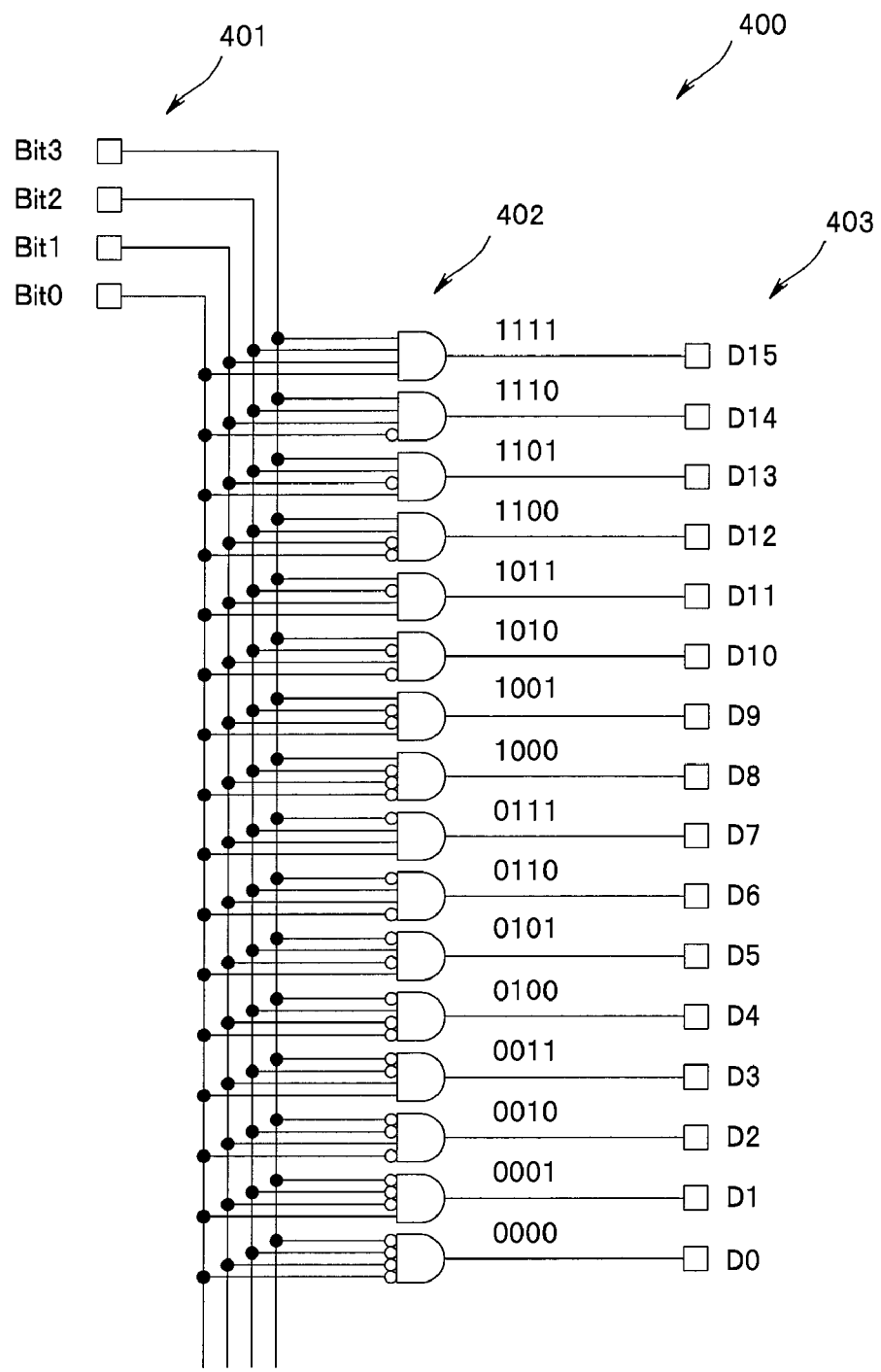
FIG. 5 is a circuit diagram showing a configuration example of a decoder according to the first embodiment of the present invention.

FIG. 5 is a circuit diagram showing a configuration example of the decoder 400. The decoder 400 is configured by including an input section 401 having four input terminals (Bit0 to Bit3) for receiving a 4-bit input data, a converting section 402 configured to convert the 4-bit data into a 16-bit data, and an output section 403 having 16 output terminals (D0 to D15) for outputting the 16-bit data. Here, the converting section 402 includes 16 AND (logical product) circuits. Inverter circuits are provided in the input terminals of the 16 AND circuits so that an output is generated by only one of the AND circuits for each of 16 values (0 to 15) expressed by 4 bits. The outputs of the AND circuits are connected to the output terminals so as to correspond to each other.

In FIG. 5, for example, the first AND circuit is configured in such a manner that four inverter circuits are respectively provided in four input terminals of the first AND circuit so that when the 4-bit input data is (0, 0, 0, 0), an output can be generated only at the output terminal D0 of the output section 403. Further, the second AND circuit is configured in such a manner that three inverter circuits are respectively provided in three input terminals of the second AND circuit so that when the 4-bit input data is (0, 0, 0, 1), an output can be generated only at the output terminal D1 of the output section 403. Similarly, an AND circuit having no inverter circuit is provided so that when the 4-bit input data is (1, 1, 1, 1), an output can be generated only at the output terminal D15 of the output section 403. That is, for the output of the decoder 400, only one of the wirings (that is, outputs) is made active (set to H corresponding to logic "1" in the example).

Figure 6:
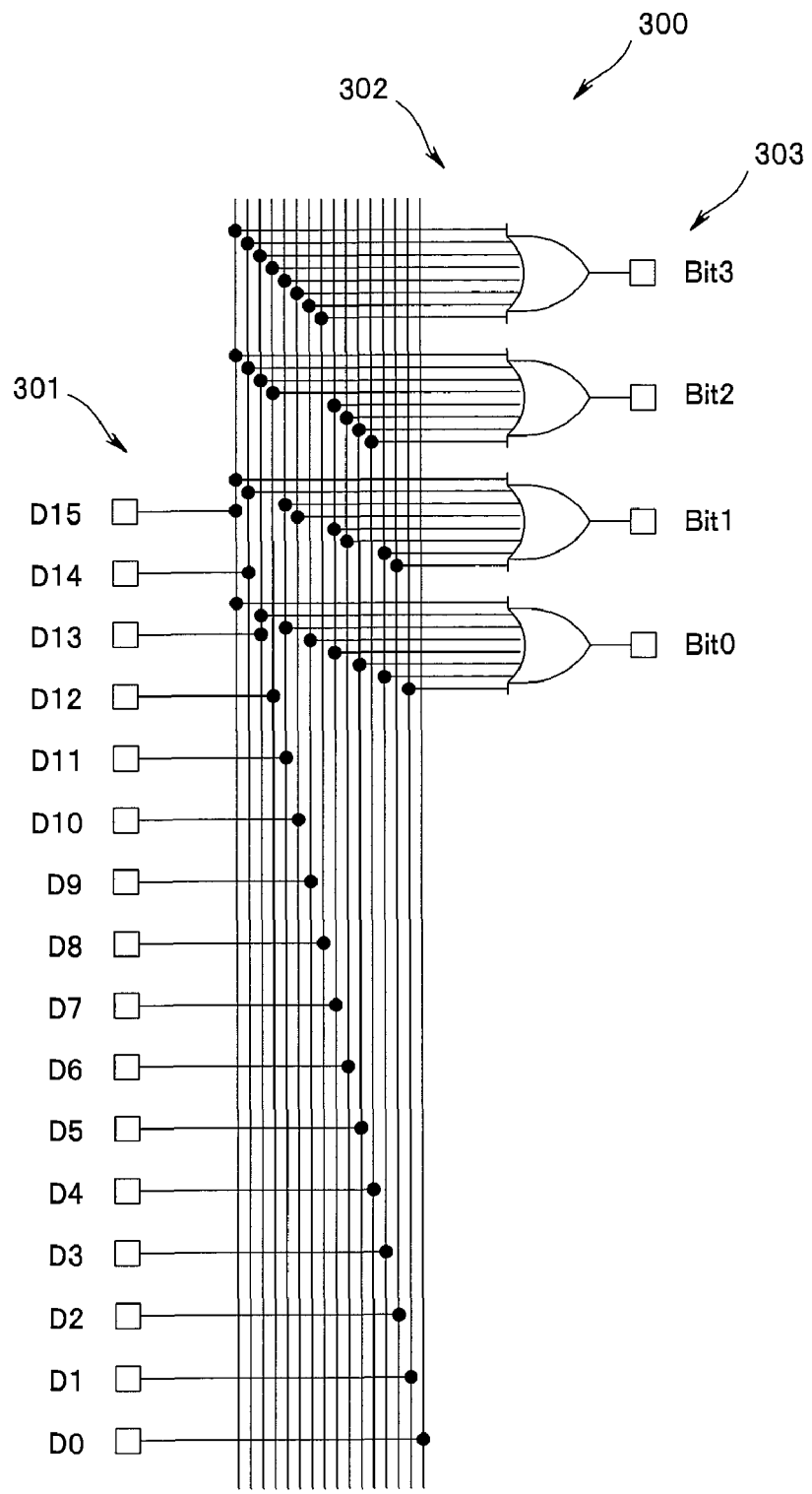
FIG. 6 is a circuit diagram showing a configuration example of an encoder according to the first embodiment of the present invention.

FIG. 6 is a circuit diagram showing a configuration example of the encoder 300. The encoder 300 is configured by including an input section 301 having 16 input terminals (D0 to D15) for receiving a 16-bit input data, a converting section 302 configured to convert a 16-bit input data into a 4-bit data, and an output section 303 having four output terminals (Bit0 to Bit3) for outputting a plurality of bit data, here, a 4-bit data. Here, the converting section 302 includes four OR (logical sum) circuits, and the connection between the input terminals of each of the four OR circuits and the input terminals of the input section 301 is made different for each of the four OR circuits so that an output is output from the converting section 302 in correspondence with 16 values expressed by 16 bits.

As shown in FIG. 6, the first OR circuit receives, as an input, eight data from the input terminals D8 to D15 among 16-bit data. The second OR circuit receives, as an input, eight data from the input terminals D4 to D7 and D12 to D15 among 16-bit data. The third OR circuit receives, as an input, eight data from the input terminals D2, D3, D6, D7, D10, D11, D14 and D15 among 16-bit data. The fourth OR circuit receives, as an input, eight data from the input terminals D1, D3, D5, D7, D9, D11, D13 and D15 among 16-bit data.

FIG. 7 to FIG. 10 are circuit diagrams showing configuration examples of the sub-wiring networks 501 to 504, respectively. In the sub-wiring network 501 of FIG. 7, each input terminal of an input section 501a including 16 terminals and each output terminal of an output section 501b including 16 terminals are connected to each other in one-to-one correspondence via a wiring section 501c including a plurality of wirings. Further, the 16 input terminals of the input section 501a (0 to 15) are connected to the 16 output terminals (0 to 15) of the output section 501b, so as to prevent the input terminals from being respectively connected as they are to the output terminals at the same positions in such a manner that the input terminal 0 is connected to the output terminal 0, that the input terminal 1 is connected to the output terminal 1, and similarly that the input terminal 15 is connected to the output terminal 15.

Figure 7:
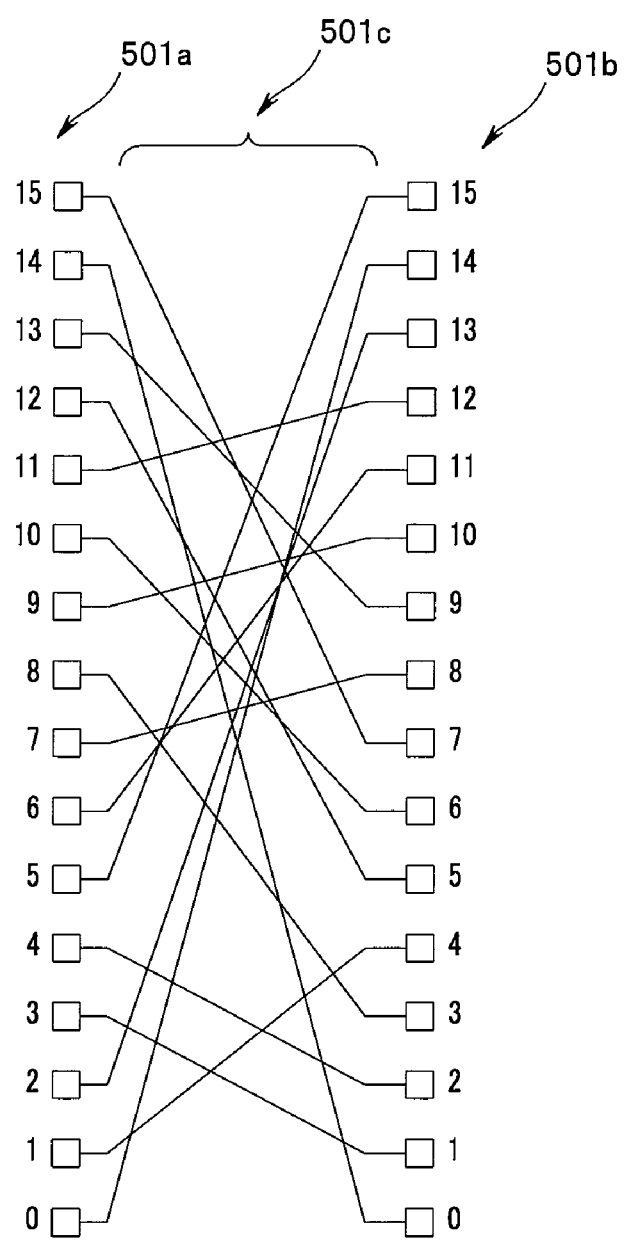
FIG. 7 is a circuit diagram showing an example of a configuration of a sub-wiring network according to the first embodiment of the present invention.

That is, the sub-wiring network 501c is configured so as to change the order of wirings corresponding to the decoded data from the decoder 400 or 16 signals input into the input section 501a. As shown in FIG. 7, the wiring pattern between the plurality of input terminals and the plurality of output terminals is formed so that the arrangement order of the decoded data which is a plurality of bit data at the plurality of input terminals of the sub-wiring network 501c is changed into a predetermined arrangement order at the output terminals of the sub-wiring network 501c. As a result, the sub-wiring network 501c outputs the decoded data to the encoder 300 by replacing the bit positions of the decoded data.

As described above, only one output among the 16 outputs (0 to 15) from the decoder 400 is set to H, and hence the position of the terminal set to output H at the output terminal 501b is different from the position of the terminal set to receive "1" at the input terminal 501a. For example, in FIG. 7, the respective wirings in the wiring section 501c are connected so that among the data representing values of 0 to 15, the value of 15 is converted to 7, and the value of 14 is converted to 0. The wirings between the plurality of input terminals and the plurality of output terminals are connected so that the 16 input data are not output as the same value.

Figure 8:
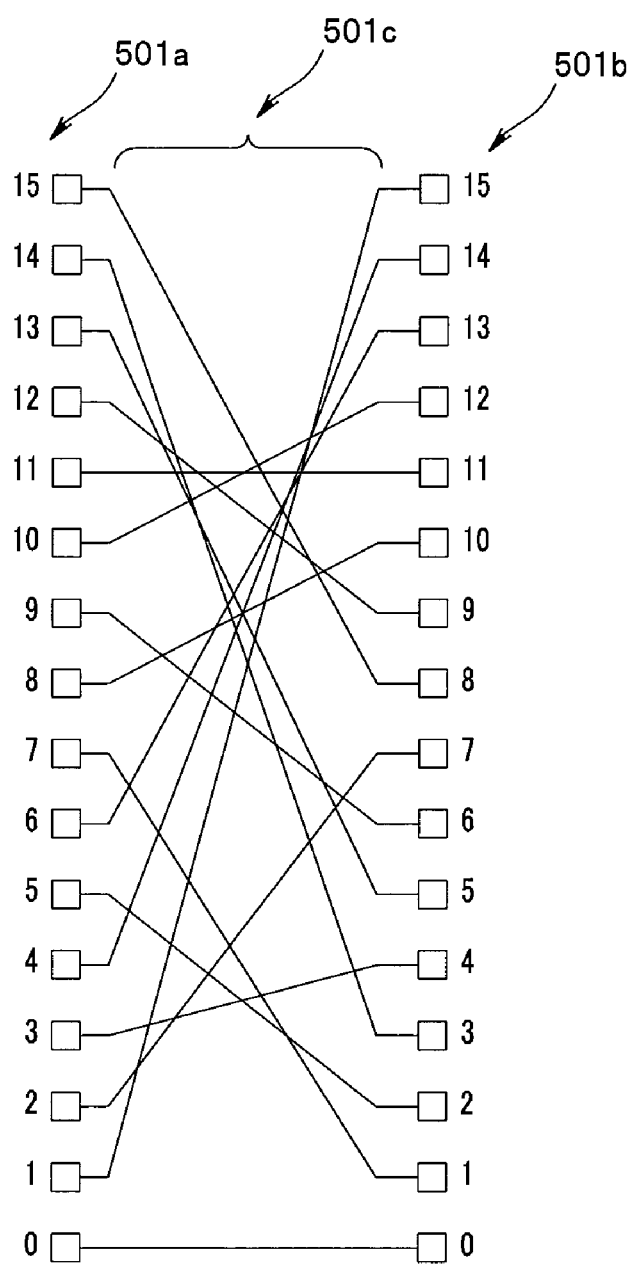
FIG. 8 is a circuit diagram showing an example of a configuration of a sub-wiring network according to the first embodiment of the present invention.
Figure 9:
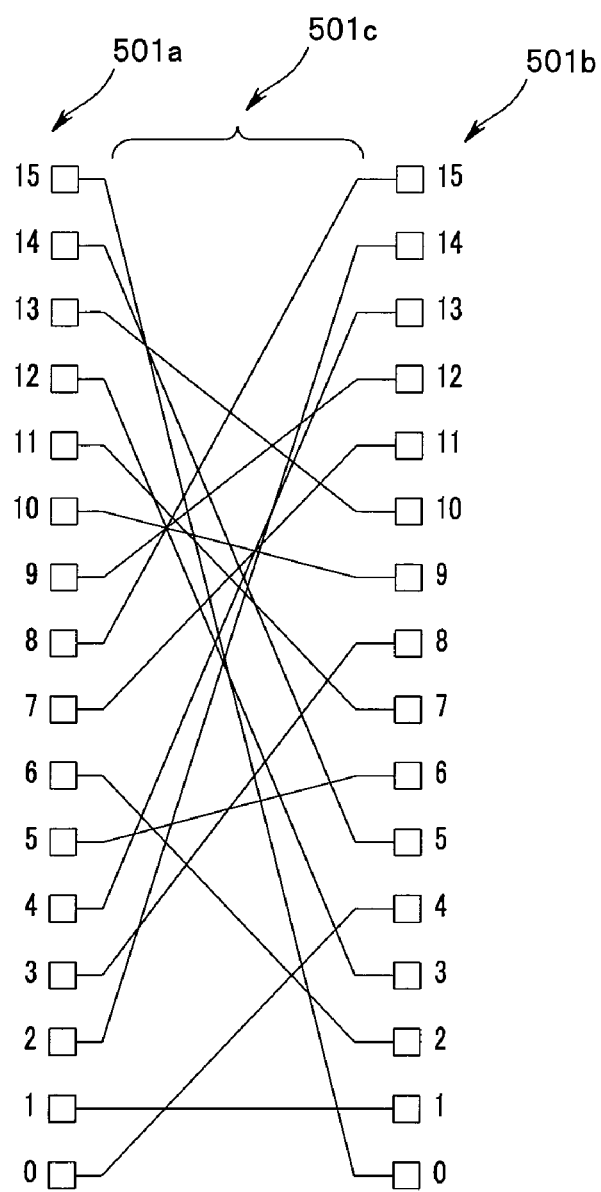
FIG. 9 is a circuit diagram showing an example of a configuration of a sub-wiring network according to the first embodiment of the present invention.
Figure 10:
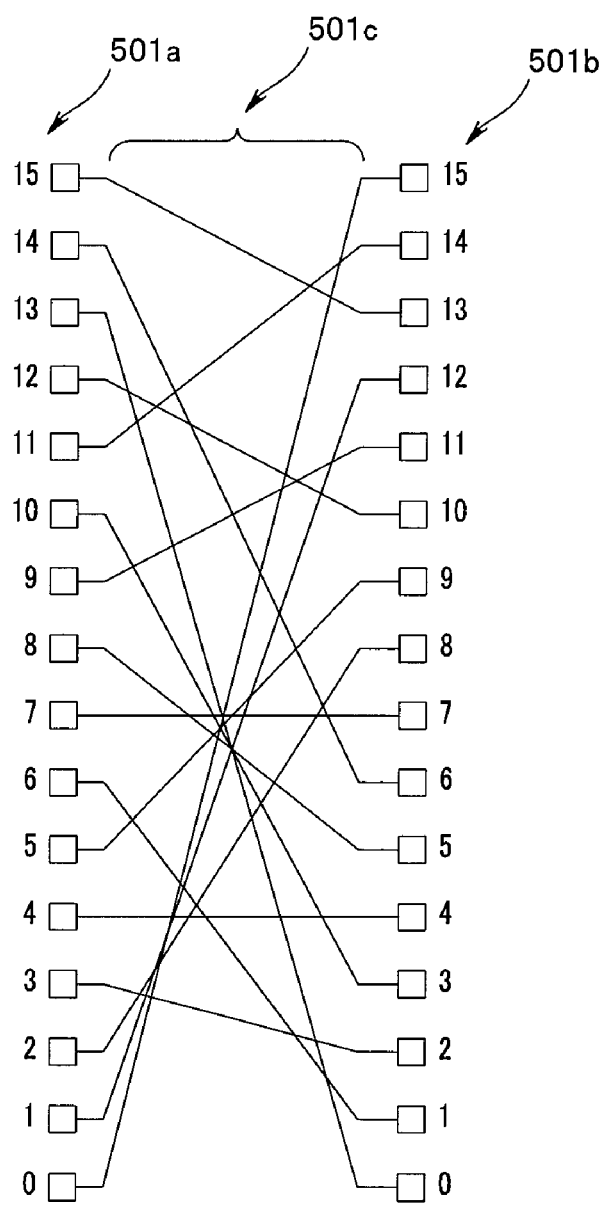
FIG. 10 is a circuit diagram showing an example of a configuration of a sub-wiring network according to the first embodiment of the present invention.

Similarly, also in the sub-wiring networks 502 to 504, as respectively shown in FIG. 8 to FIG. 10, each terminal of the input terminal 501a including 16 terminals is connected to each terminal of the output terminal 501b including 16 terminals in one-to-one correspondence via the wiring section 501c including a plurality of wirings. Note that as shown in FIG. 8 to FIG. 10, one or more terminals in the input terminal 501a may be connected to one or more terminals in the output terminal 501b at the same one or more positions.

As described above, one of the sub-wiring networks 501 to 504 is selected by the selecting section 510.

An operation of the circuit of FIG. 3 is described by using an example. For example, when a 6-bit data (010011) is input into the input terminal section 101, it is set that A5=0, A4=1, A3=0, A2=0, A1=1 and A0=1. Therefore, (A5, A0)=(0, 1), and (A4, A3, A2, A1)=(1, 0, 0, 1)=9.

Here, the most significant bit and the least significant bit among the 6-bit input data are transmitted to the selecting section 510. The remaining 4 bits are transmitted to the decoder 400 so as to be decoded.

When (A4, A3, A2, A1)=(1, 0, 0, 1) is input into the input section 401 of the decoder 400, only one AND circuit of the converting section 402 shown in FIG. 5 outputs H. That is, only one of the 16 AND circuits outputs H in correspondence with the input data. In this case, only the output terminal D9 in FIG. 5 outputs H. That is, only the output of the output terminal D9 corresponding to the value "9" of the input data is set to H, and the output of the remaining output terminals is set to L.

The output of H of the output terminal D9 (other output terminals set to the output of L) in the output section 403 is input into each corresponding terminal of all the input terminals 501a of the sub-wiring networks 501 to 504.

By the replacement of the wiring in the sub-wiring network 502 (S1-1), as shown in FIG. 8, the signal input into the terminal of "9" is output from the terminal of "6". Similarly, by the replacement of the wiring in the sub-wiring network 501 (S1-0), the sub-wiring network 503 (S1-2), and the sub-wiring network 504 (S1-3), as respectively shown in FIG. 7, FIG. 9 and FIG. 10, the input signal input into the terminal of "9" is output from the terminal of "10" in the sub-wiring network 501 (S1-0), output from the terminal of "12" in the sub-wiring network 503 (S1-2), and output from the terminal of "11" in the sub-wiring network 504 (S1-3).

That is, the output of the sub-wiring network 501 (S1-0) is set to (0000010000000000). The output of the sub-wiring network 502 (S-1) is set to (0000000001000000). The output of the sub-wiring network 503 (S1-2) is set to (0001000000000000). The output of the sub-wiring network 504 (S1-3) is set to (0000100000000000). The 16-bit signal of each of the sub-wiring networks is transmitted to the selecting section 510.

Since the input data is set as (A5, A0)=(0, 1), the selecting section 510 selects the sub-wiring network 502 (S1-1). Further, the input data is set as (A4, A3, A2, A1)=(1, 0, 0, 1)=9, and the terminal of "6" in the sub-wiring network 502 (S1-1) is set to H, so that the selecting section 510 outputs an output (0000000001000000) to the encoder 300.

In the encoder 300, as shown in FIG. 6, only the input terminal D6 of the input section 301 is set to H, and hence the four OR circuits of the converting section 302 output an output (0110) to the four output terminals (Bit0 to Bit3) of the output section 303. Therefore, as shown in FIG. 4, when the value of the input data is set to 9, the decimal value of 6 is output as a binary data (0110).

As described above, in the S-Box, the decoder 400 decodes the input data to the decoded data so that only one terminal in the plurality of output terminals is set to H, and outputs the decoded data to the wiring network section 200. Then, the wiring network 200 changes the bit pattern of the decoded data so that the arrangement order of the input plurality of bit data, or the order of the wiring corresponding to each bit of the input data is changed at the plurality of output terminals, and outputs the changed bit pattern to the encoder 300. At the time, in the output plurality of bit data, only one bit is set to H, and the other bits are set to L. Then, the output of the wiring network 200 is encoded to a predetermined data by the encoder 300, and thereby the nonlinear conversion processing referred to as S1 in the S-Box of the f function section 22 is realized.

According to the above described configuration, in the S-Box, only one signal of H is surely processed in the wiring network 200, and hence the power consumption does not depend on the input data. Especially, the power consumption of a CMOS logic circuit depends on a data which is processed. Therefore, an encryption processing circuit having resistance to a so-called power analysis attack is realized.

Figure 11:
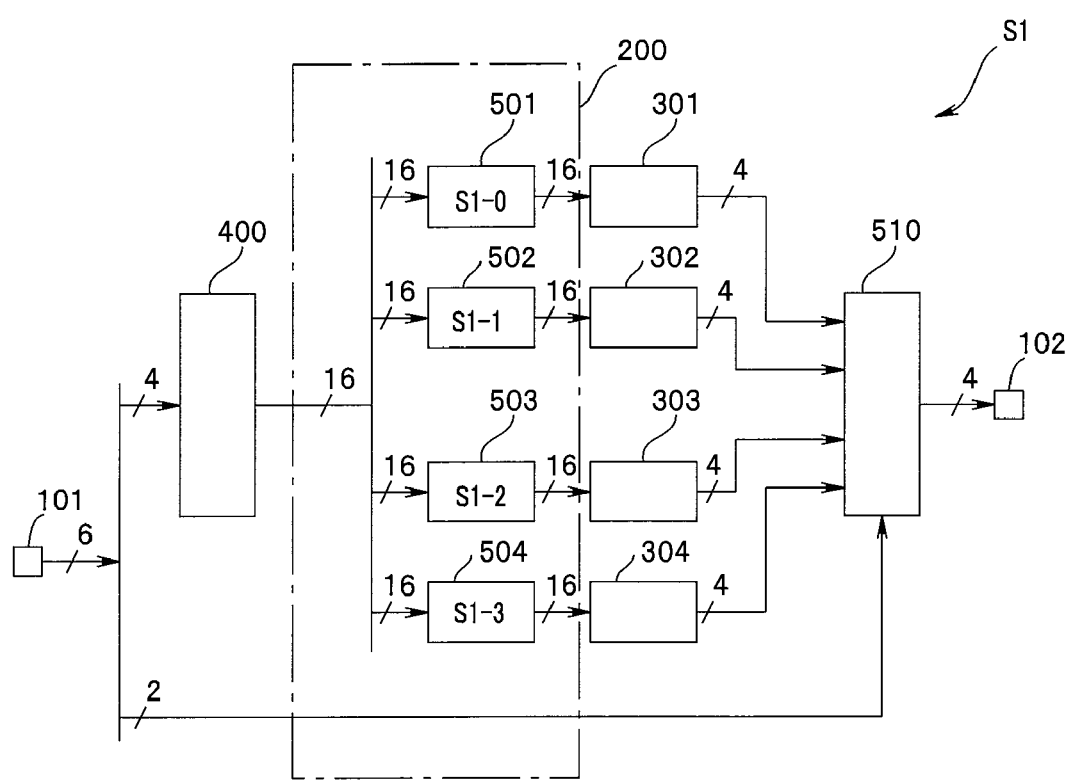
FIG. 11 is a block diagram showing a configuration of a modification of the circuit according to the first embodiment of the present invention.

Note that the circuit shown in FIG. 3 can be modified as follows. FIG. 11 is a block diagram showing a configuration of a modification of FIG. 3. The circuit shown in FIG. 11 is configured in such a manner that encoders 301, 302, 303, 304 are provided before the selecting section 510 in correspondence with the respective sub-wiring networks, and the encoded data are selected by the selecting section 510. As compared with the circuit shown in FIG. 3, the arrangement order of the selecting section 510 and the encoder is changed in FIG. 11, but exactly the same output is obtained.

Further, examples in which a 4-bit data is decoded are shown in FIG. 7 to FIG. 10. However, since the input of S-Box is 6 bits, it may also be configured such that the 6-bit data is decoded so as to be converted into 64-bit (two to the power of 6) data, and the 64-bit data, the bits of which are replaced, is then encoded. In this case, the output of the S-Box becomes 6-bit data, and hence it is possible to realize the 4-bit output of the encoder by removing 2-bit data at the time of encoding.

Second Embodiment

Next, a second embodiment according to the present invention will be described with reference to FIG. 12 to FIG. 22. The second embodiment is an example in which mask processing is performed in an encryption processing circuit. The mask processing of the present embodiment is data masking processing for masking a data.

Here, the mask processing means processing in which in order to prevent a data for encryption processing from being acquired, an original data is converted to have a form different from that of the original data by acting a random number or the like on the original data, so as to be processed, and the mask is removed after the processing is completed.

For example, when an encryption processing circuit 1A is incorporated in a device such as an IC card, a mask data (hereinafter also referred to simply as "mask") is added to a key data which is read from an EEPROM (not shown) in the IC card, and the masked key data is input into the encryption processing circuit 1A. Then, in the encryption processing circuit 1A, after the mask is removed, predetermined computing is performed. A mask is added to an output data after the computing, and the masked output data is output. In a reception side circuit, the mask of the masked output data is removed.

Also, the encryption processing circuit 1A has the decoder, the wiring network and the encoder as described in the first embodiment and performs the encryption processing. Thus, the power consumption of the encryption processing circuit 1A does not depend on the input data. A wiring network 2A in FIG. 12 is, for example, the wiring network of S-Box as shown in FIG. 7 to FIG. 10 according to the first embodiment.

Therefore, according to the present embodiment, it is possible to prevent a secret data from being directly stolen from an input/output data of the encryption processing circuit 1A by adding a mask to the data itself input/output to/from the encryption processing circuit 1A. Also, it is possible to realize an encryption processing circuit having resistance to a so-called power analysis attack by using the same wiring network or the like as the first embodiment.

Note that in the following description, the same components as those in the first embodiment are denoted by the same reference numerals and characters, and the explanation of the components is omitted.

Figure 12:
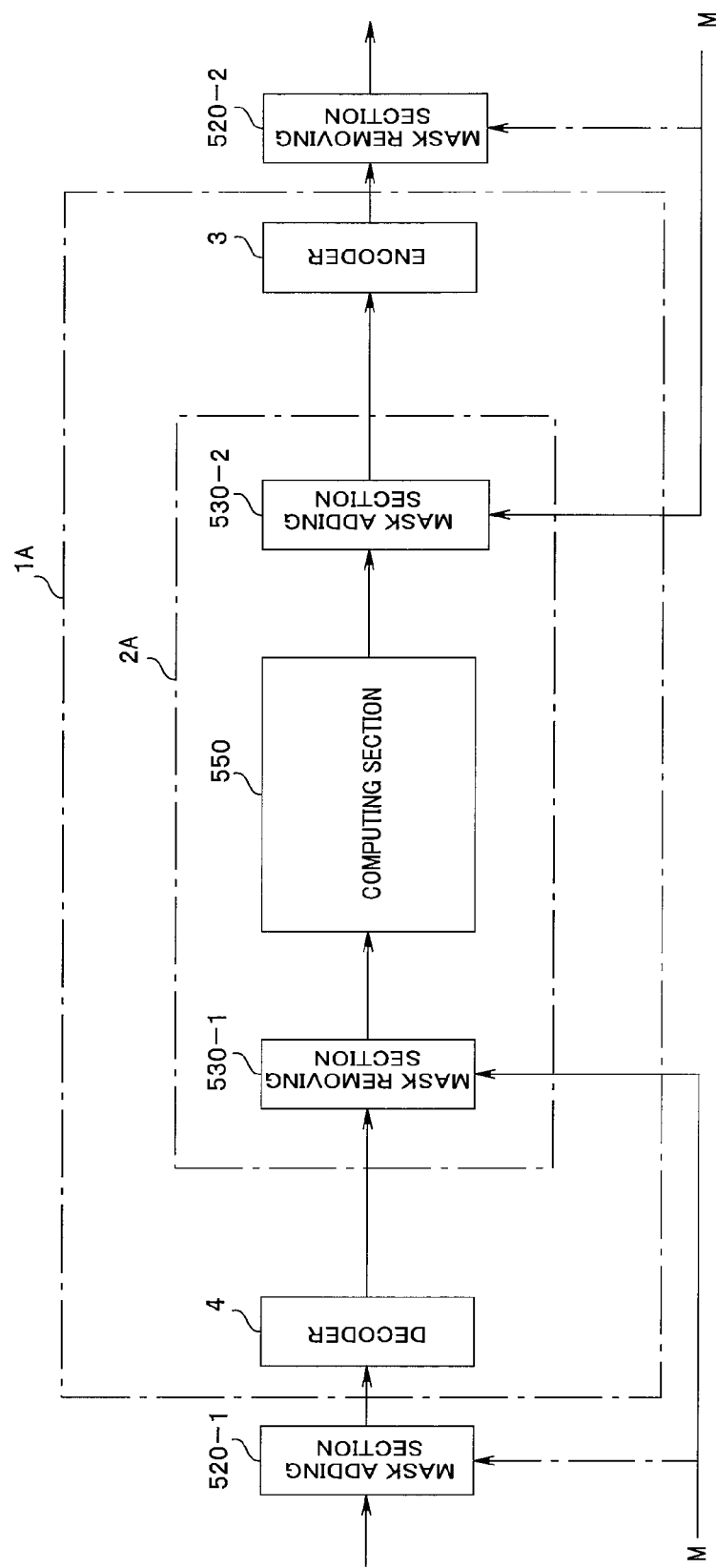
FIG. 12 is a block diagram for explaining a configuration of an encryption processing circuit according to a second embodiment of the present invention.

FIG. 12 is a block diagram for explaining a configuration of the encryption processing circuit 1A according to the second embodiment. The encryption processing circuit 1A is configured by including the wiring network 2A, an encoder 3 and a decoder 4. The wiring network 2A includes a mask removing section 530-1, a computing section 550, and a mask adding section 530-2. The mask removing section 530-1 is connected to the decoder 4, and the computing section 550 is connected to the mask removing section 530-1. A data decoded in the decoder 4 is input into the mask removing section 530-1, and the mask removing section 530-1 outputs the data whose mask is removed to the computing section 550. The mask adding section 530-2 is connected to the computing section 550, and the mask adding section 530-2 is connected to the encoder 3. The mask adding section 530-2 receives the output of the computing section 550, and adds a mask to the output, and outputs the masked data to the encoder 3.

That is, after decoding the input data, the encryption processing circuit 1A performs the removing processing of the mask and then performs predetermined encryption computing. The wiring network 2A performs predetermined encryption computing to the decoded data whose mask is removed, to generate a change bit data. The change bit data is generated by replacing bit positions of the plurality of bit data which is input from the mask removing section 530-1 and whose mask is removed.

After the predetermined encryption computing, the encryption processing circuit 1A further performs mask adding processing and then encoding processing, so as to output the encoded data.

Thus, the data input into the decoder 4 of the encryption processing circuit 1A is subjected to mask adding processing based on a mask data in a mask adding section 520-1 except the encryption processing circuit 1A. The data output from the encoder 3 of the encryption processing circuit 1A is subjected to mask removing processing based on a mask data which is the same as or different from the mask data used in the mask adding section 520-1, in a mask removing section 520-2 except the encryption processing circuit 1A. In the data input processing in the encryption processing circuit 1A, an inlet mask processing section is configured by the mask adding section 520-1 and the mask removing section 530-1, and an outlet mask processing section is configured by the mask adding section 530-2 and the mask removing section 520-2.

For example, when the encryption processing circuit 1A in FIG. 12 is the S-Box of DES, the input data is 6 bits and the output data is 4 bits. Therefore, the input data of the decoder 4 is 6 bits and the output data thereof is 64 bits. The wiring network 2A is a circuit configured to receive the 64-bit data, and to output, as 64-bit data, the change bit data whose bit pattern is changed from that of the input 64-bit data. The input data of the encoder 3 is 64 bits, and the output data thereof is 4 bits.

In the following, for the sake of brevity of description, the present embodiment will be described by using an example of an encryption processing circuit having a 3-bit input and a 3-bit output. In FIG. 12, there is described an example in which a 3-bit input data is input into the encryption processing circuit 1A, and a 3-bit output data is output.

The wiring network 2A in FIG. 12 includes the mask removing section 530-1 and the mask adding section 530-2 each of which is formed by a wiring network. In the present embodiment, exclusive-OR processing is used as the mask processing, but the other processing may also be used. Usually, an exclusive OR is realized by a combinational circuit of logic circuits.

FIG. 13 shows a truth table of an exclusive OR. FIG. 13 shows output values with respect to two inputs in the exclusive OR.

In the mask removing section 530-1, the mask added to the decoded data is removed from the decoded data by taking an exclusive OR between 8-bit data decoded by the decoder 4 and a predetermined mask data.

For example, when an exclusive OR between a data value 3 (=011) and a mask data 000 is taken, an output value becomes 3 (=011). When an exclusive OR between a data value 3 (=011) and a mask data 001 is taken, an output value becomes 2 (=010). Further, when an exclusive OR between a data value 2 (=010) and a mask data 000 is taken, an output value becomes 2 (=010). When an exclusive OR between a data value 0 (=010) and a mask data 001 is taken, an output value becomes 3 (=011). FIG. 14 shows a table representing a relation between the input value and the output value in the case where an exclusive OR is taken by using a mask data 001. As shown in FIG. 14, the exclusive OR taken with the mask data with the least significant bit set to 1 corresponds to the bit replacement with the adjacent bit in the decoded data. Similarly, exclusive OR taken with a mask data with another bit set to 1 is realized by the bit replacement in the decoded data. Therefore, the exclusive OR processing which is the mask processing can be realized by using the wiring network for performing the bit replacement.

Further, it is possible to obtain the data with the mask removed by taking an exclusive OR between the same mask data as used for the mask addition and the masked data. For example, when an exclusive OR between a data value 3 (=011) and a mask data 001 is taken, a masked data value 2 (=010) is obtained. Further, when an exclusive OR between the masked data value 2 (=011) and the mask data 001 is taken, a data value 3 (=011) with the masked removed can be obtained.

It is realized to take the exclusive OR by the replacement of wirings in the wiring network. Therefore, the mask removing section 530-1 is realized by the wiring network.

Figure 15:
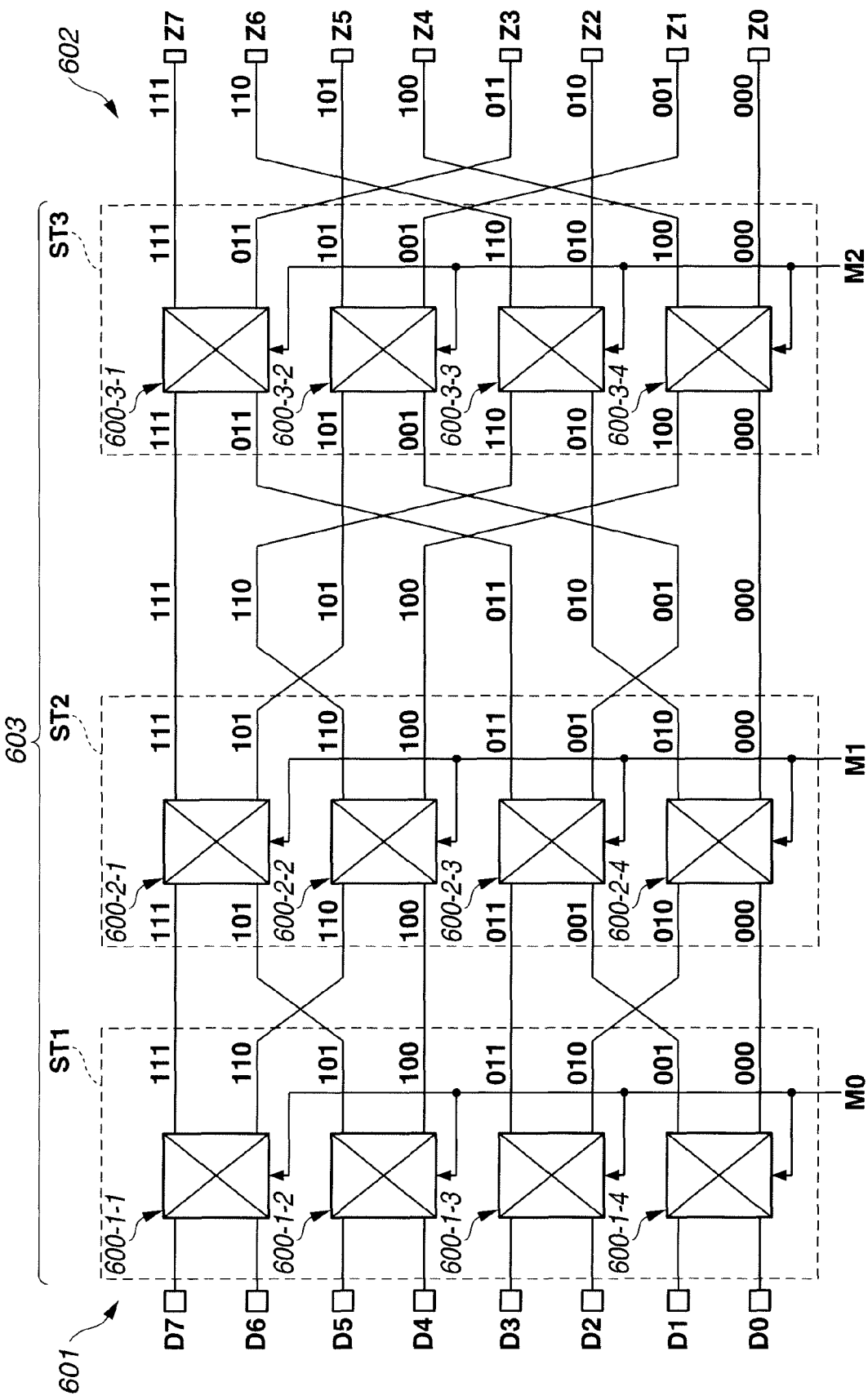
FIG. 15 is a block diagram showing a configuration example of a wiring network for realizing mask removing processing in a mask removing section corresponding to data masking according to the second embodiment of the present invention.

FIG. 15 is a block diagram showing a configuration example of a wiring network for realizing a mask removing processing in the mask removing section 530-1 corresponding to the data masking. The wiring network for realizing the mask addition processing in the mask adding section 520-1 also has the same configuration as the circuit of FIG. 15.

The decoder 4 of FIG. 12 is a circuit configured to decode a 3-bit input to an 8-bit output, and similarly to the case in FIG. 5, outputs H to only one bit of the 8 bits in correspondence with data values represented by the 3 bits. Further, the encoder 3 of FIG. 12 is a circuit which encodes an 8-bit input to a 3-bit output.

The mask removing section 530-1 of FIG. 15 is an example in which an exclusive OR is realized by an 8-bit wiring network, and is configured by including an input section 601 having eight input terminals (D0 to D7), an output section 602 having eight output terminals (Z0 to Z7) for outputting 8-bit data, and a converting section 603 configured to perform predetermined conversion processing to an 8-bit data and to output the converted 8-bit data.

The mask removing section 530-1 of FIG. 15 is configured by including a plurality of selection circuits (here four circuits) 600-1-1, 600-1-2-2, 600-2-1, 600-2-2. A stage ST1 as the first stage is configured by the selection circuits 600-1-1, 600-1-2, 600-1-3, 600-1-4. A stage ST2 as the second stage is configured by the selection circuits 600-2-1, 600-2-2, 600-2-3, 600-2-4. A stage ST3 as the third stage is configured by the selection circuits 600-3-1, 600-3-2, 600-3-3, 600-3-4. The each selection circuit has two input data (input 1 and input 2), one control input, and two output data (output 1 and output 2). According to the control input as a control signal, the each selection circuit transmits and outputs the input 1 and the input 2 to either of the output 1 and the output 2, respectively.

In FIG. 15, when the control input is set to 0, two input data are directly output, respectively, so that the input 1 is output from the output 1 and the input 2 is output from the output 2. When the control input is set to 1, the two input data are replaced to be output, so that the input 1 is output from the output 2 and the input 2 is output from the output 1. In other words, the each selection circuit 600 is a circuit configured to change the manner that two signals input into the two input terminals appear in the two output terminals, according to the control input which is input into the control input terminal.

In the first stage ST1 of FIG. 15, an exclusive OR between the least significant bit of the 3-bit input data and the mask data is realized. In the second stage ST2, an exclusive OR between the second bit of the 3-bit input data and the mask data is realized. In the third stage ST3, an exclusive OR between the most significant bit of the 3-bit input data and the mask data is realized.

The eight outputs from the input section 601 are input into eight input terminals of the four selection circuits 600 of the first stage ST1. The eight outputs of the four selection circuits 600 of the first stage ST1 are input into eight input terminals of the four selection circuits 600 of the second stage ST2 via a wiring section. Further, the eight outputs of the four selection circuits 600 of the second stage ST2 are input into eight input terminals of the four selection circuits 600 of the third stage ST3 via a wiring section. In the mask removing section 530-1, the first to eighth input terminals are connected to the first to eighth output terminals, respectively, but the wirings are partially replaced as will be described below.

The wiring in the wiring section between the first and second stages ST1 and ST2 has a first wiring replacing section. Specifically, as shown in FIG. 15, the wirings are replaced in such a manner that the lower side output terminal of the first selection circuit 600-1-1 of the first stage ST1 is connected to the upper side input terminal of the second selection circuit 600-2-2 of the second stage ST2, that the upper side output terminal of the second selection circuit 600-1-2 of the first stage ST1 is connected to the lower side input terminal of the first selection circuit 600-2-1 of the second stage ST2, that the lower side output terminal of the third selection circuit 600-1-3 of the first stage ST1 is connected to the upper side input terminal of the fourth selection circuit 600-2-4 of the second stage ST2, and that the upper side output terminal of the fourth selection circuit 600-1-4 of the first stage ST1 is connected to the lower side input terminal of the third selection circuit 600-2-3 of the second stage ST2.

The wiring in the wiring section between the second and third stages ST2 and ST3 has a second wiring replacing section. Specifically, as shown in FIG. 15, the wirings are replaced in such a manner that the lower side output terminal of the first selection circuit 600-2-1 of the second stage ST2 is connected to the upper side input terminal of the second selection circuit 600-3-2 of the third stage ST3, that the upper side output terminal of the second selection circuit 600-2-2 of the second stage ST2 is connected to the upper side input terminal of the third selection circuit 600-3-3 of the third stage ST3, that the lower side output terminal of the second selection circuit 600-2-2 of the second stage ST2 is connected to the upper side input terminal of the fourth selection circuit 600-3-4 of the third stage ST3, that the upper side output terminal of the third selection circuit 600-2-3 of the second stage ST2 is connected to the lower side input terminal of the first selection circuit 600-3-1 of the third stage ST3, that the lower side output terminal of the third selection circuit 600-2-3 of the second stage ST2 is connected to the lower side input terminal of the second selection circuit 600-3-2 of the third stage ST3, and that the upper side input terminal of the fourth selection circuit 600-2-4 of the second stage ST2 is connected to the lower side input terminal of the third selection circuit 600-3-3 of the third stage ST3.

Further, the eight outputs of the four selection circuits 600 of the third stage ST3 are connected to the first to eighth output terminals. At this time, as shown in FIG. 15, the wiring between the converting section 603 and the plurality of output terminals has a third wiring replacing section, so that the first to eighth output terminals of the four selection circuits 600 of the third stage ST3, are respectively connected to the first, fifth, third, seventh, second, sixth, fourth and eighth output terminals.

As described above, the mask removing section 530-1 is a wiring network for mask processing configured to receive a plurality of bit data from the decoder 4, and to generate a plurality of bit data subjected to the mask removing processing by replacing the bit positions of the received plurality of bit data.

Figure 16:
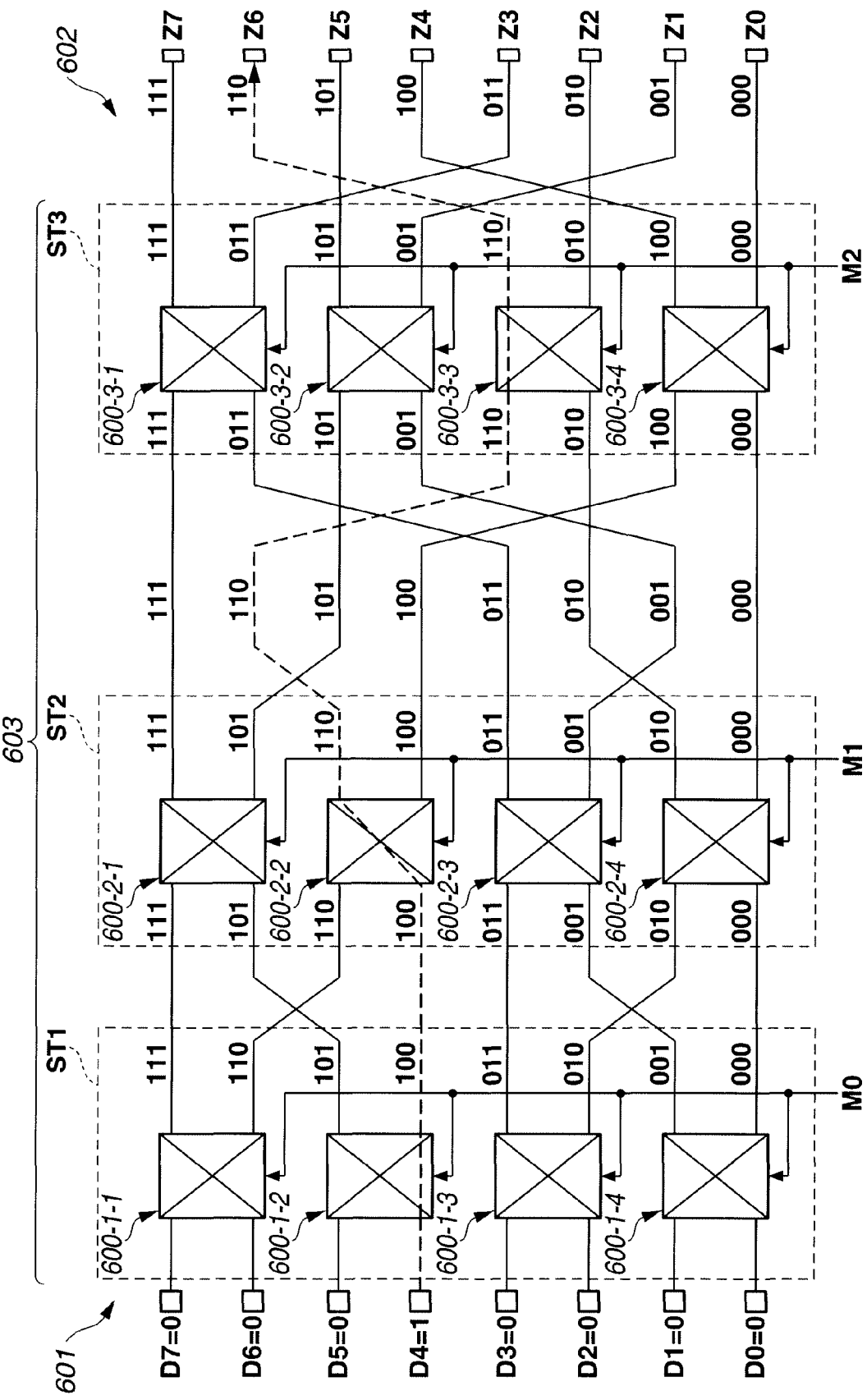
FIG. 16 is a figure for explaining an operation of the wiring network of FIG. 15 according to the second embodiment of the present invention.

An operation of the circuit of FIG. 15 is described by using an example. FIG. 16 is a figure for explaining an operation of the circuit shown in FIG. 15. When it is assumed that the input data is set to 110 (=6) and the mask data (M2, M1, M0) are set to 010, a result of the exclusive OR between the input data and the mask data: 100 (=4) is input into the encryption processing circuit 1A as a masked data. Therefore, the output of the decoder 4 is set to 00010000. A logic value of "0" which is the least significant bit of the mask data is input as a control signal into the first stage ST1 of the mask removing section 530-1. In first stage ST1, the control input is set to 0, and hence the input value is output as it is. Therefore, the output of the selection circuit 600 of the first stage ST1 is set to 00010000.

When the output is input into the second stage ST2, the second bit is replaced with the third bit, and the sixth bit is replaced with the seventh bit by the wiring connection between the first stage ST1 and the second stage ST2, but a value of 00010000 is input into the second stage ST2. Since the control signal of the second stage ST2 is set to 1, adjacent bits of the input data are replaced with each other, so that the output of the selection circuit 600 of the second stage ST2 is set to 00100000.

When the output is input into the third stage ST3, a value of 00001000 is input into the third stage ST3 by the wiring connection between the second stage ST2 and the third stage ST3. Since a value of 0 is input into the third stage ST3 as the control signal, the input data of 00001000 is output as it is. In the final stage of the mask removing section 530-1, the bit replacement is further performed, so that 01000000 is eventually output. In FIG. 16, the path of the input data in the mask removing section 530-1 is shown by the dotted line.

As described above, an output which is the same as the result obtained at the time of decoding the input data as it is by decoder 4, is output from the mask removing section 530-1. In this way, the mask removal by taking exclusive OR is performed by the mask removing section 530-1.

Figure 17:
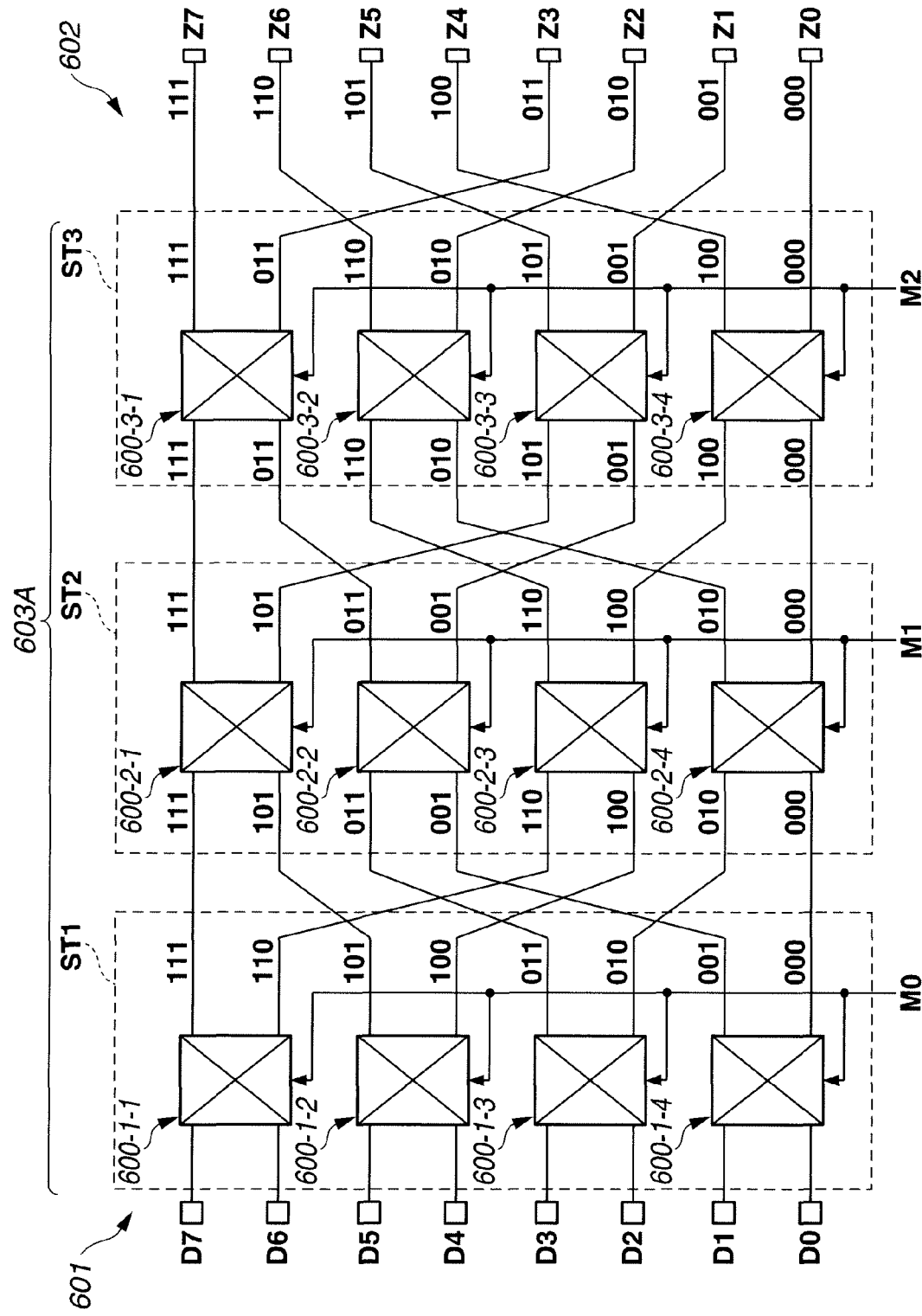
FIG. 17 is a block diagram showing a circuit of a modification of the circuit shown in FIG. 15 according to the second embodiment of the present invention.

FIG. 17 is a block diagram showing a circuit of a modification of the circuit shown in FIG. 15. The circuit of FIG. 17 is a switching network circuit having a repeated configuration for realizing the same function as the circuit of FIG. 15, and has a converting section 603A configured to perform predetermined conversion processing to an 8-bit data and outputs the converted 8-bit data. In the circuit of FIG. 17, the pattern of wiring connection between the first stage ST1 and the second stage ST2, the pattern of wiring connection between the second stage ST2 and the third stage ST3, and the final stage wiring pattern between the third stage ST and the output terminal (D0 to D15) of the output section 602, are the same with each other. The same function as in FIG. 15 can also be realized by the wiring having such pattern.

Specifically, the wiring of the wiring section between the first ST1 and the second stage ST2 has a first wiring replacing section. Specifically, as shown in FIG. 17, the wiring is replaced in such a manner that the lower side output terminal of the first selection circuit 600-1-1 of the first stage ST1 is connected to the upper side input terminal of the third selection circuit 600-2-3 of the second stage ST2, that the upper side output terminal of the second selection circuit 600-1-2 of the first stage ST1 is connected to the lower side input terminal of the first selection circuit 600-2-1 of the second stage ST2, that the lower side output terminal of the second selection circuit 600-1-2 of the first stage ST1 is connected to the lower side input terminal of the third selection circuit 600-2-3 of the second stage ST2, that the upper side output terminal of the third selection circuit 600-1-3 of the first stage ST1 is connected to the upper side input terminal of the second selection circuit 600-2-2 of the second stage ST2, that the lower side output terminal of the third selection circuit 600-1-3 of the first stage ST1 is connected to the upper side input terminal of the fourth selection circuit 600-2-4 of the second stage ST2, and that the upper side output terminal of the fourth selection circuit 600-1-4 of the first stage ST1 is connected to the lower side input terminal of the second selection circuit 600-2-2 of the second stage ST2. The connection between the second stage ST2 and the third stage ST3, and the connection between the third stage ST3 and the plurality of output terminals are also the same.

Note that in the case of FIG. 15, the exclusive OR operation is used as the mask processing, but it is also possible to use a remainder adding operation. When the remainder adding operation is used, the mask removing section 530-1 can be realized by the shifting of bits.

The case where the remainder adding operation is used is described by the same example as described above. When the input data is set to 110 (=6), and when a value of 010 (=2) is used as the mask data, the input data to the encryption processing device 1A, after being subjected to the remainder adding operation, is 0 (=8). Thus, the output of the decoder 4 is set to 00000001, which is input into the mask removing section 530-1. In the mask removing section 530-1, only the bit corresponding to the mask is replaced. In this example, the mask is set to 2, and hence 2-bit right rotate shift processing is performed in the mask removing section 530-1. As a result, the output of the mask removing section 530-1 is set to 01000000, and thereby the mask is removed.

Figure 18:
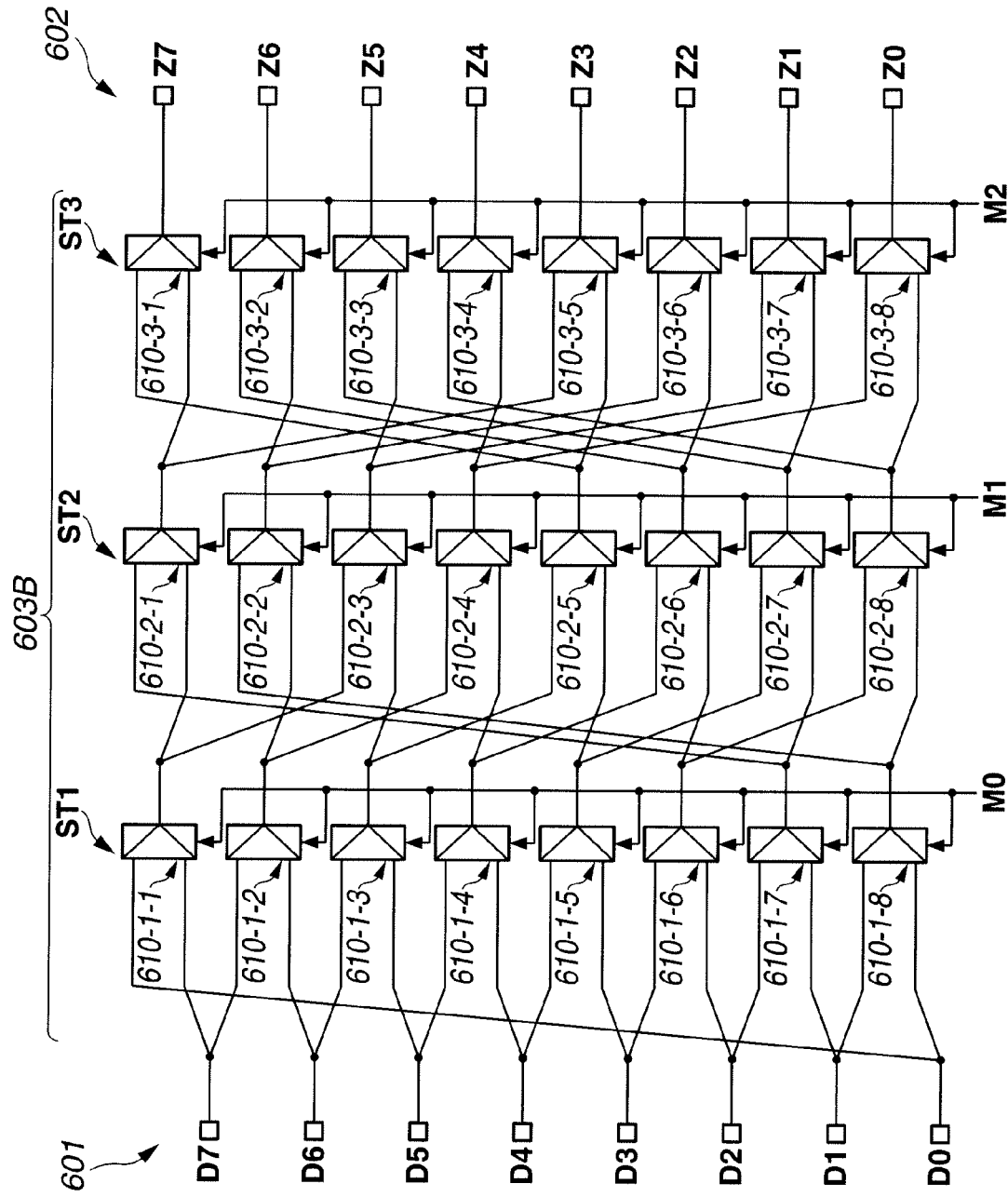
FIG. 18 is a figure showing an example of a circuit configuration for realizing right rotate shift processing according to the second embodiment of the present invention.
Figure 19:
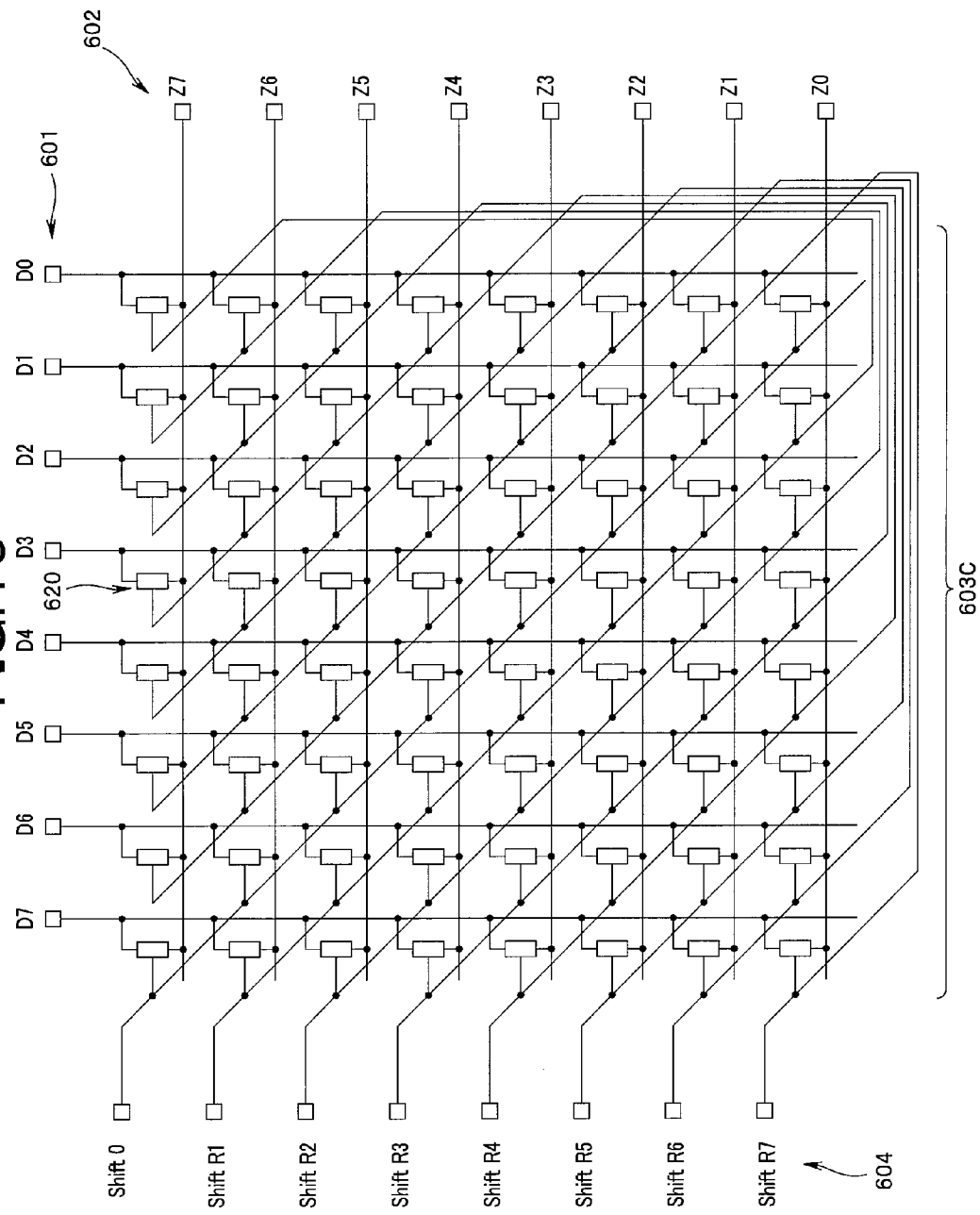
FIG. 19 is a figure showing an example of a circuit configuration for realizing right rotate shift processing according to the second embodiment of the present invention.

FIG. 18 and FIG. 19 are figures showing examples of circuit configurations for realizing the right rotate shift processing. FIG. 18 is a figure showing a configuration example in the case where decoded input data and encoded mask data are input. FIG. 19 is a figure showing a configuration example in the case where decoded input data and decoded mask data are input. The mask removing function can be realized by using these circuits.

FIG. 18 shows an example in which the right rotate shift is realized by an 8-bit wiring network, and shows an example of a wiring network which uses a switching network configured by connecting two-input/one-output selection circuits 610 in multiple stages so as to correspond to the right rotate shift.

In the case of FIG. 18, the mask removing section 530-1 is a wiring network configured by including a plurality of selection circuits 610. The first to third stages ST1 to ST3 of a converting section 603B include a selector, respectively. The each selector includes eight selection circuits 610.

The each selection circuit 610 has two inputs (input 1 and input 2), one control input, and one output. According to the control input input into the control input terminal, the each selection circuit 610 transmits and outputs one of the input 1 and the input 2 to the output terminal. In the case of FIG. 18, when the control input as a control signal is set to 0, the lower side input 2 of the each selection circuit 610 is output from the output terminal, and when the control input is set to 1, the upper side input 1 of the each selection circuit 610 is output from the output terminal.

Input data D7 to D0 of the input section 601 are respectively input into one of the inputs of each of the adjacent two selection circuits 610-1 included in the selection circuit group of the first stage ST1. Specifically, the input data D7 is input into the input 2 of the selection circuit 610-1-1 and into the input 1 of the selection circuit 610-1-2. The input data D6 is input into the input 2 of the selection circuit 610-1-2 and into the input 1 of the selection circuit 610-1-3. In the same manner, each of the input data is input into one of the inputs of each of the adjacent two selection circuits. However, for effecting the right rotate shift, it is configured such that the input data D0 is input into the input 2 of the selection circuit 610-1-8 and into the input 1 of the selection circuit 610-1-1. The bit M0 of the mask data (M2, M1, M0) is input into the control input of the each selection circuit 610-1.

The output of the first stage ST1 is input into the selection circuit group of the second stage ST2. The outputs of the plurality of selection circuits 610-1 of the first stage ST1 are respectively input into one of the inputs of each of the every other two selection circuits of the plurality of selection circuits 610-2 of the second stage ST2. Specifically, the output of the selection circuit 610-1-1 is input into the input 2 of the selection circuit 610-2-1 and into the input 1 of the selection circuit 610-2-3 with the selection circuit 610-2-2 skipped. The output of the selection circuit 610-1-2 is input into the input 2 of the selection circuit 610-2-2 and into the input 1 of the selection circuit 610-2-4 with the selection circuit 610-2-3 skipped. Similarly, the output of the selection circuit 610-1 is input into one of the inputs of each of the every other two selection circuits 610-2. However, for effecting the right rotate shift, it is configured such that the output of selection circuit 610-1-7 is input into the input 1 of the selection circuit 610-2-1, and the output of selection circuit 610-1-8 is input into the input 1 of the selection circuit 610-2-2. The bit M1 of the mask data (M2, M1, M0) is input into the control input of the each selection circuit 610-2.

The output of the second stage ST2 is input into the selection circuit group of the second stage ST3. The outputs of the plurality of selection circuits 610-2 of the second stage ST2 are respectively input into one of the inputs of each of the every fourth two selection circuits of the plurality of selection circuits 610-3 of the third stage ST2. Specifically, the output of the selection circuit 610-2-1 is input into the input 2 of the selection circuit 610-3-1 and into the input 1 of the selection circuit 610-3-5 with the selection circuits 610-3-2, 610-3-3, 610-3-4 skipped. The output of the selection circuit 610-2-2 is input into the input 2 of the selection circuit 610-3-2 and into the input 1 of the selection circuit 610-3-6 with the selection circuits 610-3-3, 610-3-4, 610-3-5 skipped. Similarly, the output of the selection circuit 610-2 is input into each one of every fourth two selection circuits 610-3. However, for effecting the right rotate shift, it is configured such that the output of selection circuit 610-2-5 is input into the input 1 of the selection circuit 610-3-1, that the output of selection circuit 610-2-6 is input into the input 1 of the selection circuit 610-3-2, that the output of selection circuit 610-2-7 is input into the input 1 of the selection circuit 610-3-3, and that the output of selection circuit 610-2-8 is input into the input 1 of the selection circuit 610-3-4. The bit M2 of the mask data (M2, M1, M0) is input into the control input of the each selection circuit 610-3. The output of the third stage ST3 is output from the output section 602 as output data Z7 to Z0.

In the circuit of FIG. 18, when only 1 is added to the input data, the right rotate shift is realized by setting the mask data to 001. For example, at the time of the input of 01000000 in which only the input terminal D6 is set to H, a control signal of 1 is input only into the selection circuit group of the first stage ST1 by setting the mask data to 001. As a result, the output of the output section 602 is set to 00100000. Further, when only 2 is added to the input data, the right rotate shift is realized by setting the mask data to 010. For example, at the time of the input of 01000000 in which only the input terminal D6 is set to H, a control signal of 1 is input only into the selection circuit group of the second stage ST2 by setting the mask data to 010. As a result, the output of the output section is set to 00100000. By the above described configuration, the right rotate shift processing is realized.

In FIG. 19, the right rotate shift of the input data of the input section 601 is performed by using Shift 0, Shift R1 to Shift R7 as the decoded mask data. As shown in FIG. 19, the signal lines from the plurality of input terminals of the input data D7 to D0 and the signal lines from the plurality of output terminals of the output data Z7 to Z0 of the output section 602 are arranged in a matrix form in a converting section 603C. The mask data is input from an input section 604.

At each intersection point of the matrix, a connection element 620 for effecting connection or disconnection between the each signal line from the decoder 4 and the each output line is provided. The each connection element 620 has two data terminals and one control input terminal for controlling the connection and disconnection between the two data terminals. The signal line of the decoded mask data is connected to the control input terminal. The each connection element 620 is an element adapted to change the state of connection and disconnection between the two terminals according to the control input input into the control input terminal.

As shown in FIG. 19, when the matrix is formed by eight signal lines from the plurality of input terminals and eight output lines to the plurality of output terminals, the eight signal lines from the input section 601 are respectively connected to the eight data terminals of the eight connection elements 620 located on the respective output lines. Further, as for each of the output lines, the each signal line from the input section 604 of the mask data is connected to any one of the eight control input terminals of the eight connection elements 620 connected to the respective output lines. Further, as for each of the eight signal lines from the input section 601, the each signal line from the input section 604 is connected to any one of the eight control input terminals of the eight connection elements 620 connected to the respective signal lines from the input section 601. Then, the signal lines of the input section 604 and the control input terminals of the respective connection elements 620 are connected to each other by wirings, so that the data formed by performing the rotate shift operation to the input data of the input section 601 is output to the output section 602.

The decoded input data is shifted by the amount of right rotate shift based on the decoded mask data, that is, the shift number. To this end, the mask data corresponding to the shift number is input into the control input terminals of the respective connection elements, so that the signal line of the each input terminal is connected to the signal line of the output terminal corresponding to the shift number.

For example, in the case where the input data is set to 2 and shifted by 5 bits in the mask adding section 520-1, when an 8-bit input data of 10000000 is input in the mask removing section 530-1, the Shift R5 of the mask data is set to H. That is, in order to subtract 5 from the input data added by 5, the mask data of 00000100 for effecting the right rotate shift corresponding to 5 is input into the mask removing section 530-1. Specifically, when the input data is set to (010=2), a value of (111=7) obtained by adding 5 to the input data is input into the decoder 4. The decoder 4 decodes the input data to 10000000. The value of 10000000 is input as the input data into the shift removing section 530-1, and a value of 00000100, in which only the Shift R5 is set to H, is input as the mask data in order to subtract the value of the input data by 5. Then, the H of Shift R5 is input into the control input terminals of the corresponding connection elements. As a result, only the output terminal Z2 of the output section 602 is set to H, so that a value of 00000100 which is the same as the input data (010=2) is output.

As described above, the right rotate shift processing is also realized by the circuit shown in FIG. 19.

Figure 20:
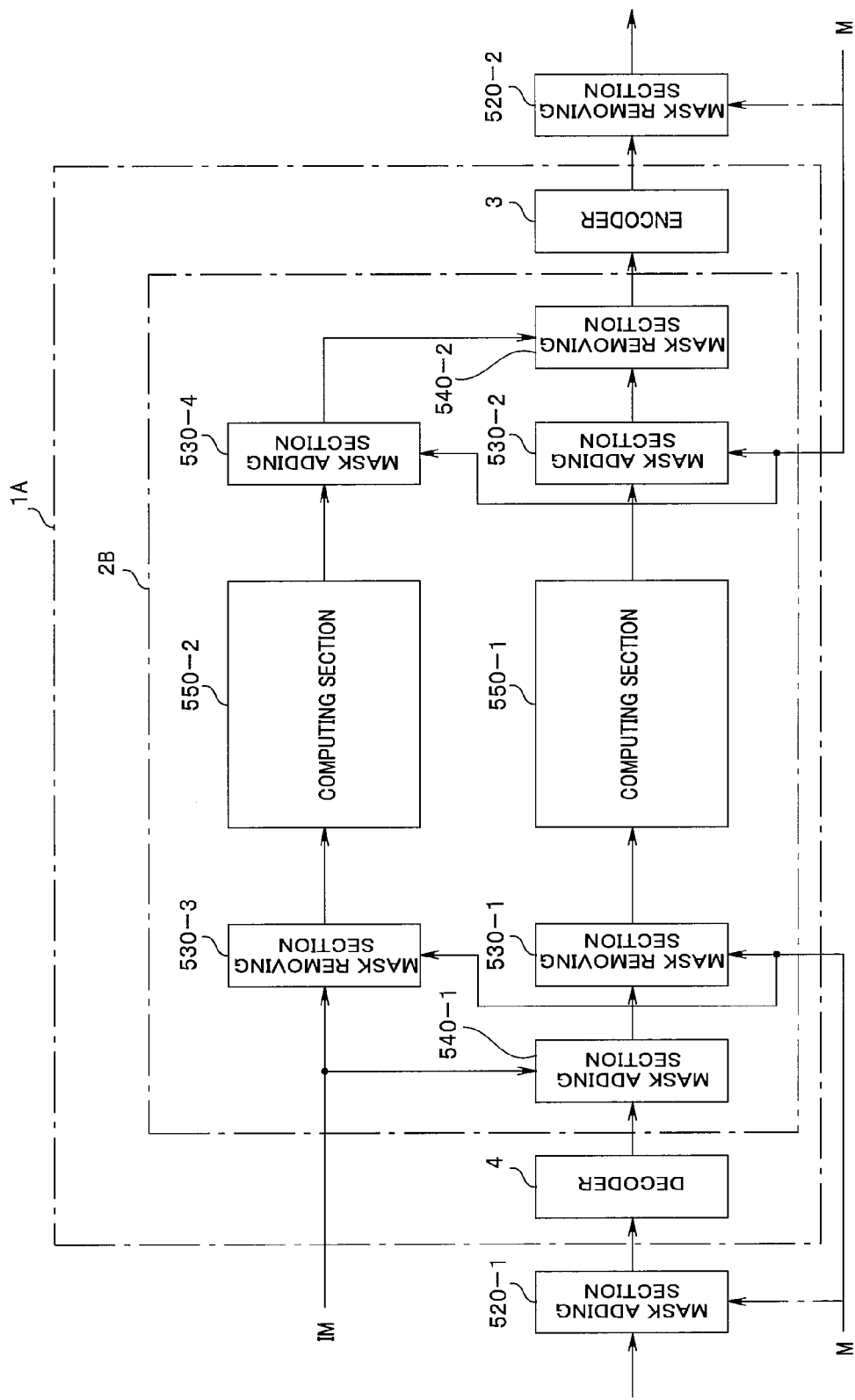
FIG. 20 shows a circuit of a modification of the second embodiment of the present invention.

FIG. 20 shows a circuit of a modification of the present embodiment. As shown in FIG. 20, in a wiring network 2B, a mask adding section 540-1 is provided before the input side mask removing section 530-1 and after the decoder 4. Further, a mask removing section 540-2 is provided after the output side mask adding section 530-2 and before the encoder 3. Also, the same circuits as the mask removing section 530-1, the mask adding section 530-2 and the computing section 550-1 are provided, and internal mask-data (hereinafter also referred to as "internal mask") IM is input into a mask removing section 530-3. The internal mask IM is also input into the mask adding section 540-1, and the mask addition processing is performed to the output of the decoder 4.

Note that the number of output data of the decoder 4 (for example, eight data), which is set to H, is one. However, in the data masked in the mask adding section 540-1, the number of data set to H is not necessarily one.

The mask M is input into the mask removing section 530-3, and the mask removing processing is performed to the internal mask IM. The mask removing section 530-3 inputs the internal mask IM subjected to the mask removing processing into the computing section 550-2, which then performs a predetermined computing operation to the internal mask IM to output the computed result to the mask adding section 530-4. The same mask M as the mask input into the output side mask adding section 530-2 is input into the mask adding section 530-4, so that the mask addition processing is performed to the output of the computing section 550-2. The output of the mask adding section 530-4 is input into the mask removing section 540-2, so that the mask removing processing is performed to the output of the mask adding section 530-2.

As described above, the same mask M as the inlet mask is input into the mask removing section 530-3, and the same mask M as the outlet mask is input into the mask adding section 530-4.

In other words, in the data input side, the data between the mask adding section 520-1 and the mask removing sections 530-1 is protected by the mask M, while in the data output side, the data between the mask adding section 530-2 and the mask removing sections 520-2 is protected by the mask M. Further, the data between the mask adding section 540-1 and the mask removing sections 540-2 is protected by the internal mask IM.

In the circuit shown in FIG. 12, the mask is removed between the mask removing section 530-1 in the input side and the mask adding section 530-2 in the output side. However, in the circuit shown in FIG. 20, the mask is added by the internal mask IM, and hence the mask is added over the entire encryption processing circuit 1A.

Note that the inlet mask and the outlet mask are the same mask M, but may be different from each other.

If the portion configured to perform the computing operation in the wiring networks 550-1 and 550-2 is linear, the same processing as that for the input data is performed to the internal mask as shown in FIG. 20, and hence it is possible to generate a mask for removing the mask.

According to the above described configuration, the number of the data (or signal lines) in which the output result of the decoder 4 is set to H is one, but the state of power consumption is further disturbed by providing the mask adding section 540-1. Therefore, even in the case where which data (or wire) is set to H may be detected on the basis of the delicate difference in the shape of the wiring pattern or the like, it is possible to prevent the data from being stolen.

Figure 21:
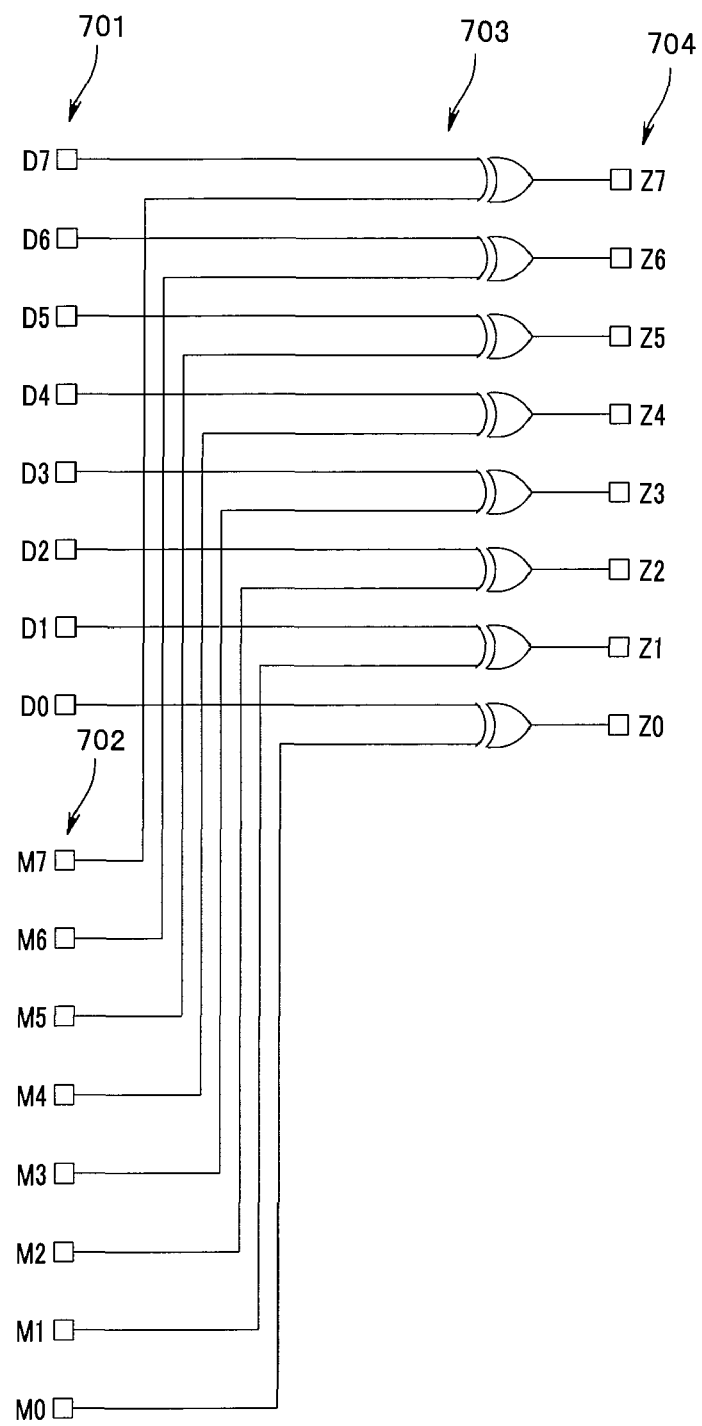
FIG. 21 is a circuit diagram showing a configuration example of a mask adding section and a mask removing section according to the second embodiment of the present invention.

The mask adding section and the mask removing section in FIG. 20 are configured by, for example, exclusive OR circuits as shown in FIG. 21. FIG. 21 is a circuit diagram showing a configuration example of the mask adding section 540-1 and the mask removing section 540-2. The mask adding section 540-1 is configured by including a data input section 701 configured to receive the output from the decoder 4, a mask input section 702 configured to receive the mask data, a computing section 703 configured to perform exclusive OR operations, and an output section 704 configured to output the computed result of the computing section 703. The outputs of eight input terminals (D7 to D0) into which an 8-bit input data is input, and the outputs of eight input terminals (M7 to M0) into which the 8-bit mask data is input, are input into the input terminals of the eight exclusive OR (XOR) circuits, respectively. The outputs of the eight XOR circuits are connected to eight output terminals (Z7 to Z0), respectively. Therefore, the data resulting from the exclusive OR operation between the input data and the mask data is output from the mask adding section 540-1. The mask removing section 540-2 is also similarly configured.

Figure 22:
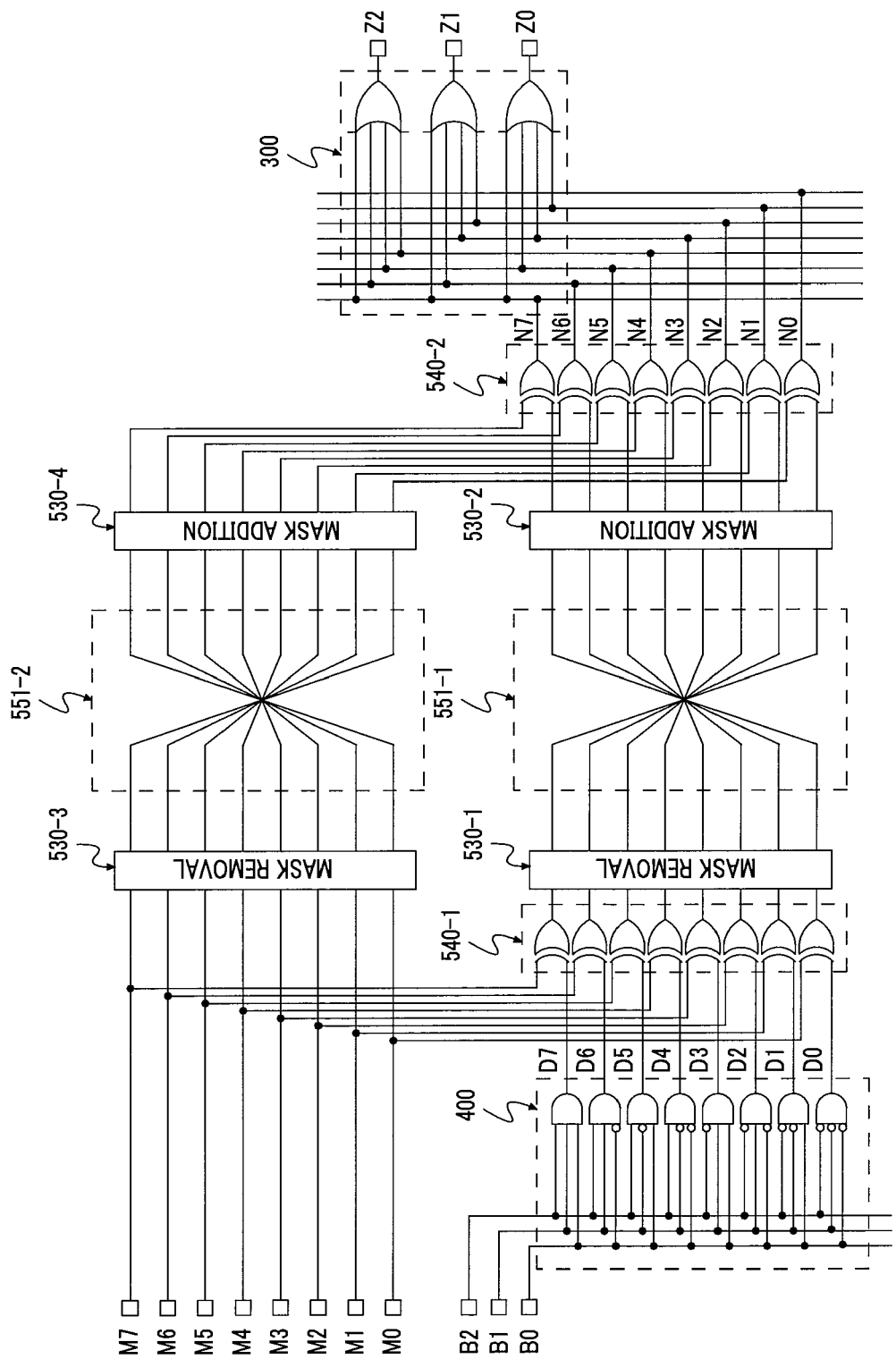
FIG. 22 is a circuit diagram showing a specific modification of the encryption processing circuit in FIG. 20 according to the first and second embodiments of the present invention.

FIG. 22 is a circuit diagram showing a specific modification of the encryption processing circuit shown in FIG. 20 corresponding to the mask processing. The masked input data is input from the input terminal (B2, B1, B0) of the input section. The input data from the input section is decoded by the decoder 400, and is input into the mask adding section 540-1.

The internal mask IM is input from the input terminals (M7 to M0) of the internal mask input section. The internal mask IM is input into the mask removing section 530-3 and the mask adding section 540-1 which are shown in FIG. 21, respectively.

The output of the mask adding section 540-1 is input into the mask removing section 530-1. The output of the mask removing section 530-1 is subjected to a predetermined computing operation by a computing section 551-1 which is realized by a wiring network, and is output to the mask adding section 530-2.

The mask removing section 530-3 performs mask removal (or addition) processing to the internal mask IM, and outputs the processing result to a computing section 551-2 realized by a wiring network. The computing section 551-2 performs a predetermined computing operation and outputs the computed result to a mask adding (or clearance) section 530-4. The mask adding section 530-4 outputs the output of the computed result to the mask removing section 540-2. The output data of the mask removing section 540-2 is encoded and output by the encoder 300.

As described above, according to the present embodiment, it is possible to prevent secret data from being directly stolen from data input/output to/from an encryption processing circuit by adding a mask to the data itself input/output to/from the encryption processing circuit. Further, according to the present embodiment, encryption processing is performed by providing the decoder, the wiring network and the encoder, as described in the first embodiment, and hence the power consumption of the encryption processing circuit does not depend on the input data to thereby make it possible to realize an encryption processing circuit having enhanced power-analysis resistance.

Modifications of the above described two embodiment described above will be described.

Figure 23:
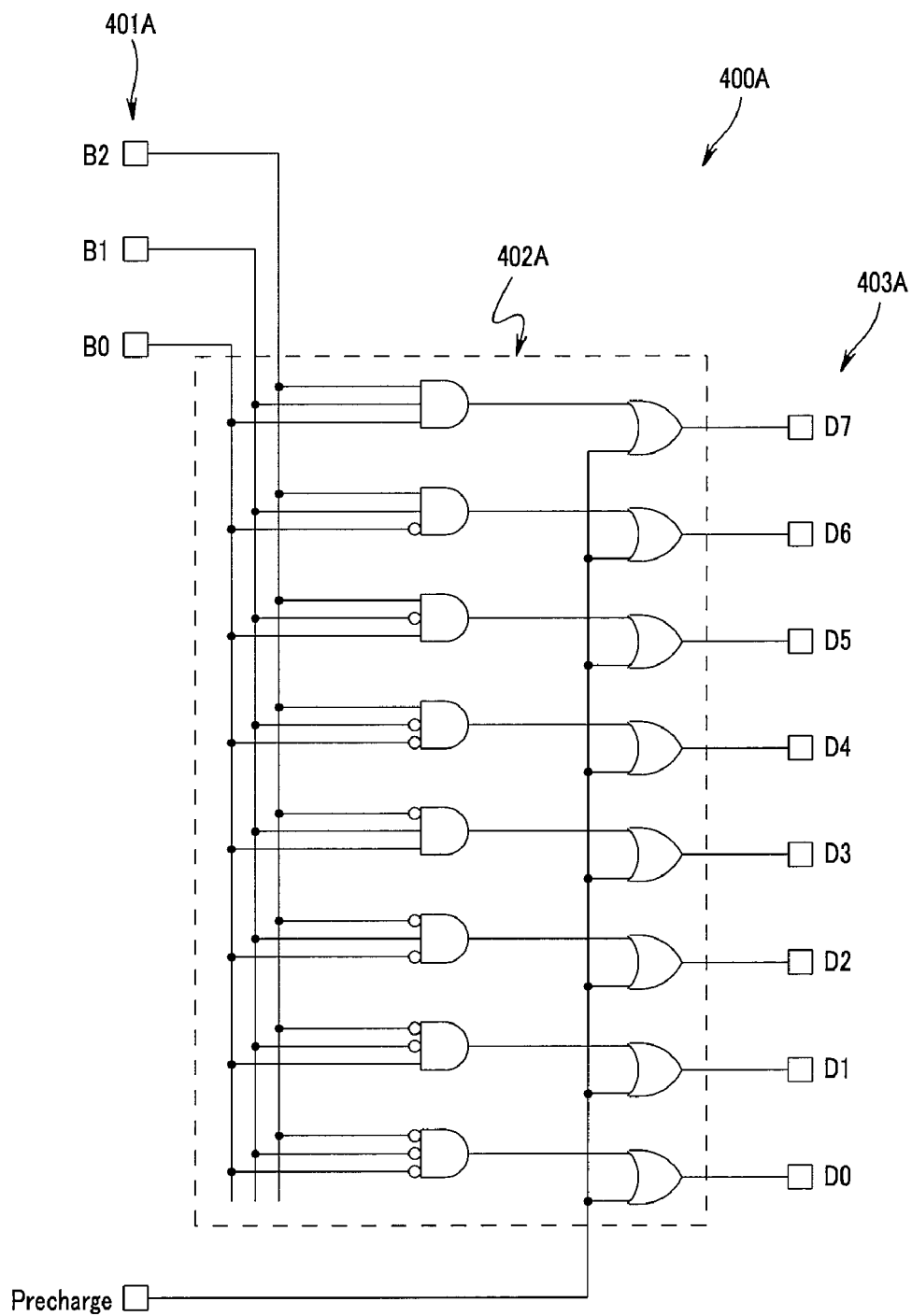
FIG. 23 is a circuit diagram showing a first modification of the decoder according to the first and second embodiments of the present invention.

FIG. 23 is a circuit diagram showing a first modification of the decoder. A decoder 400A in FIG. 23 is different from the above described decoder in that the decoder 400A is configured to have a precharge input terminal as a control input. In the decoder 400A, when the precharge input terminal (Precharge) is set to H, that is, made effective, all the outputs of the decoder 400A are set to H, so that the previous state is cleared.

Specifically, the decoder 400A is configured by including an input section 401A having three input terminals (B2 to B0) for receiving a 3-bit input data, a converting section 402A configured to convert the 3-bit data into 8-bit data, and an output section 403A having eight output terminals (D7 to D0) for outputting the 8-bit data. Here, the converting section 402A includes eight AND circuits, and an inverter circuit is provided in the input terminal of the eight AND circuits, so as to enable only one AND circuit to generate an output with respect to each of eight values (0 to 7) expressed by the 3-bit data. The output of each AND circuit is connected to one of the input terminals of a corresponding OR circuit. The precharge input terminal (Precharge) is connected to the other input terminal of the OR circuit. The output of each OR circuit is connected to each output terminal.

After receiving the input data, the circuit of FIG. 23 is operated so as to once set the precharge input terminal to H before receiving next input data. As a result, when the precharge input terminal is set to H, all the outputs of the decoder 400A are once set to H.

According to such configuration, even when the input data of the same value is continuously input into the decoder 400A, the decoder 400A is operated so as to surely change only one bit among the eight output data. Therefore, the change in power consumption of the decoder 400A is suppressed for any input data, which makes it difficult to steal the data.

Figure 24:
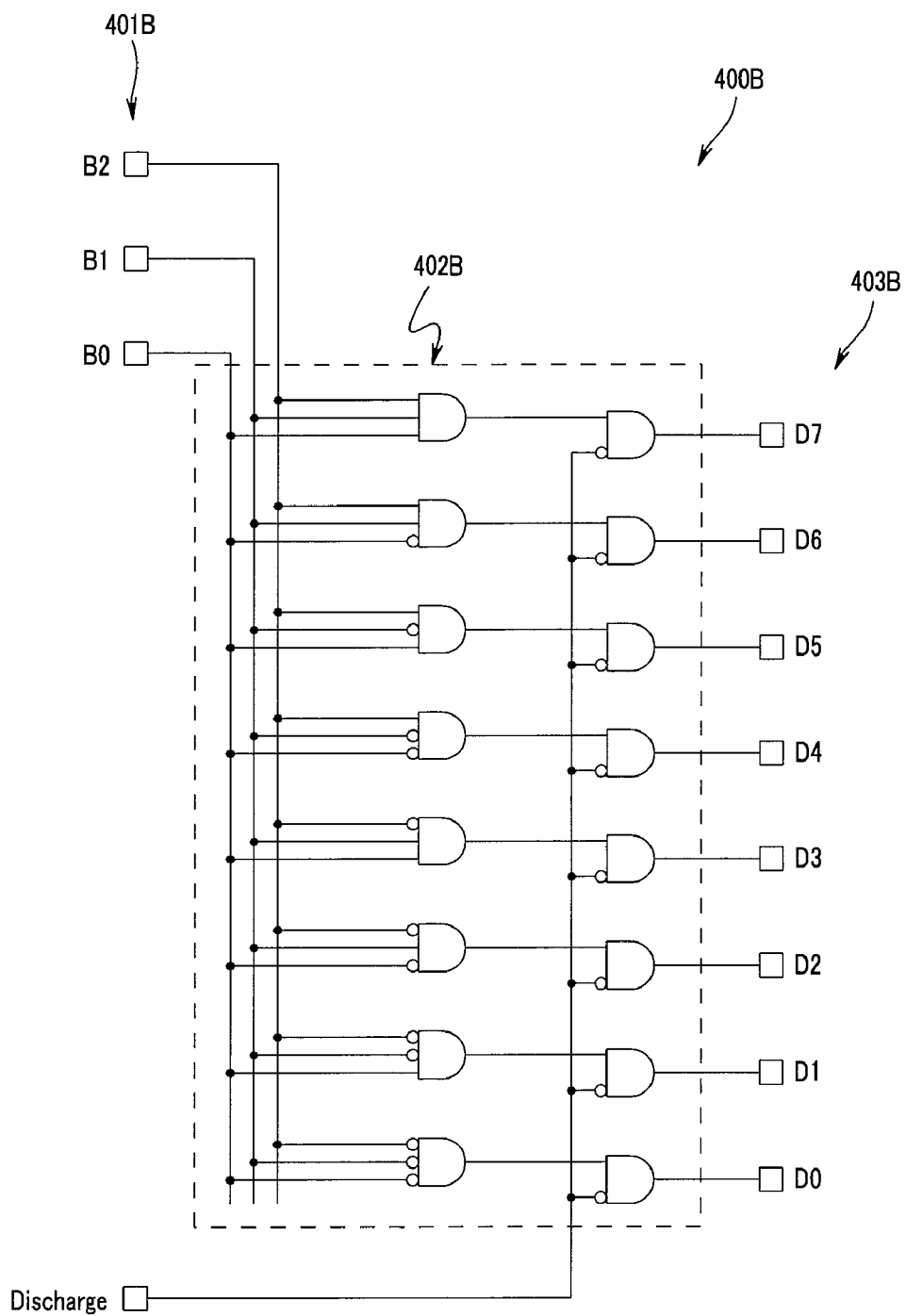
FIG. 24 is a circuit diagram showing a second modification of the decoder according to the first and second embodiments of the present invention.

FIG. 24 is a circuit diagram showing a second modification of the decoder. A decoder 400B in FIG. 24 is different from the above described decoder in that the decoder 400B is configured to have a discharge input terminal as a control input. In the decoder 400B, when the discharge input terminal (Discharge) is set to H, that is, made effective, all the outputs of the decoder 400B are set to L, so that the previous state is cleared.

Specifically, the decoder 400B is configured by including an input section 401B having three input terminals (B2 to B0) for receiving a 3-bit input data, a converting section 402B configured to convert the 3-bit data into 8-bit data, and an output section 403B having eight output terminals (D7 to D0) for outputting the 8-bit data. Here, the converting section 402B includes eight AND circuits, an inverter circuit is provided in the input terminal of the eight AND circuits, so as to enable only one AND circuit to generate an output with respect to each of eight values (0 to 7) expressed by the 3-bit data. The output of each AND circuit is connected to one of input terminals of a corresponding second stage AND circuit. The discharge input terminal (Discharge) is connected to the other input terminal of the second stage AND circuit via an inverter. The output of each second stage AND circuit is connected to each output terminal.

After receiving the input data, the circuit in FIG. 24 is operated so as to once set the discharge input terminal to H before receiving next input data. As a result, when the discharge input terminal is set to H, all the outputs of the decoder 400B are once set to L.

According to such configuration, even when the input data of the same value is continuously input into the decoder 400B, the decoder 400B is operated so as to surely change only one bit among the eight output data. Therefore, the change in power consumption of the decoder 400B is suppressed for any input data, which makes it difficult to steal the data.

Figure 25:
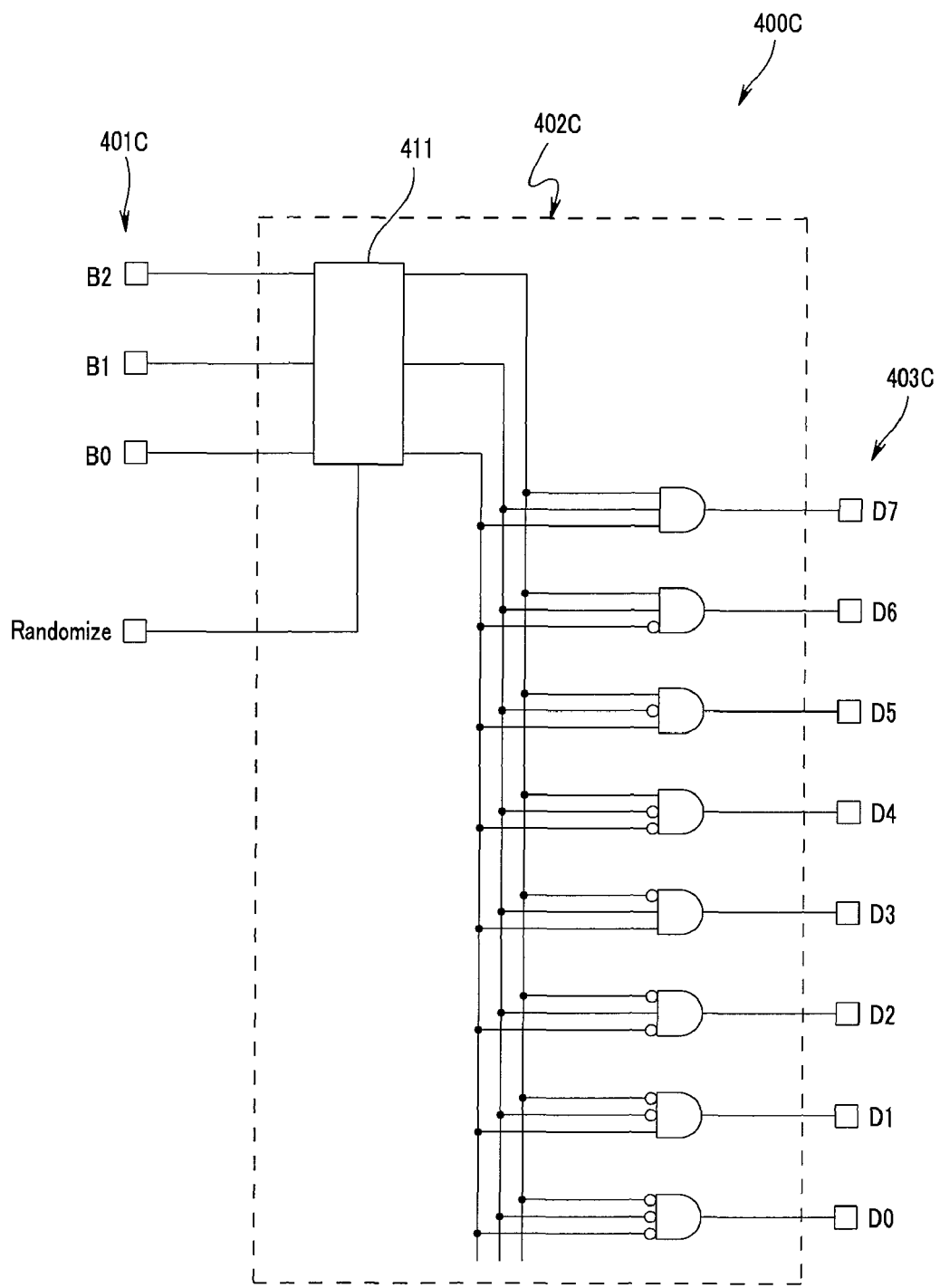
FIG. 25 is a circuit diagram showing a third modification of the decoder according to the first and second embodiments of the present invention.

FIG. 25 is a circuit diagram showing a third modification of the decoder. A decoder 400C in FIG. 25 is different from the above described decoder in that the decoder 400C is configured to have a random number input terminal as a control input. The decoder 400C has a switching section 411 and a random number input terminal (Randomize), by both of which a random number input section is configured. When the switching section 411 selects the input of the random number input terminal, the decoder 400C outputs the random number input into the random number input terminal. In other words, the output of the decoder is preset to the random value based on the random number.

Specifically, the decoder 400C is configured by including an input section 401C having three input terminals (B2 to B0) for receiving a 3-bit input data, a converting section 402C configured to convert the 3-bit data into 8-bit data, and an output section 403C having eight output terminals (D7 to D0) for outputting the 8-bit data. Here, the converting section 402C includes eight AND circuits. An inverter circuit is provided in the input terminal of the eight AND circuits, so as to enable only one AND circuit to generate an output with respect to each of eight values (0 to 7) expressed by the 3-bit data. The output of each AND circuit is connected to each output terminal.

Further, the input data from the input section 401C is input into the switching section 411, and the random number data from the random number input terminal (Randomize) is also input into the switching section 411. When the random number data from the random number input terminal is input, the switching section 411 outputs the random number to each of the AND circuits. After receiving the input data, the circuit in FIG. 25 is operated so as to make a random number input into the random number input terminal, before receiving next input data. As a result, when the random number is input into the random number input terminal, the output of the decoder 400C is once set to a random value corresponding to the random number, so that the previous state is erased.

According to such a configuration, even when the input data of the same value is continuously input into the decoder 400C, the decoder 400C is operated so as to surely change only one bit among the eight output data. Therefore, the change in power consumption of the decoder 400C does not depend on the input data, which makes it difficult to steal the data.

The switching section 411 is realized by, for example, a selector configured to switch the input data and a random number, an exclusive OR between a random number and the input data, or the like. Note that in FIG. 25, the switching section 411 for the random number is provided in the input side of the decoder 400C, but may also be provide in the output side of the decoder 400C.

Figure 26:
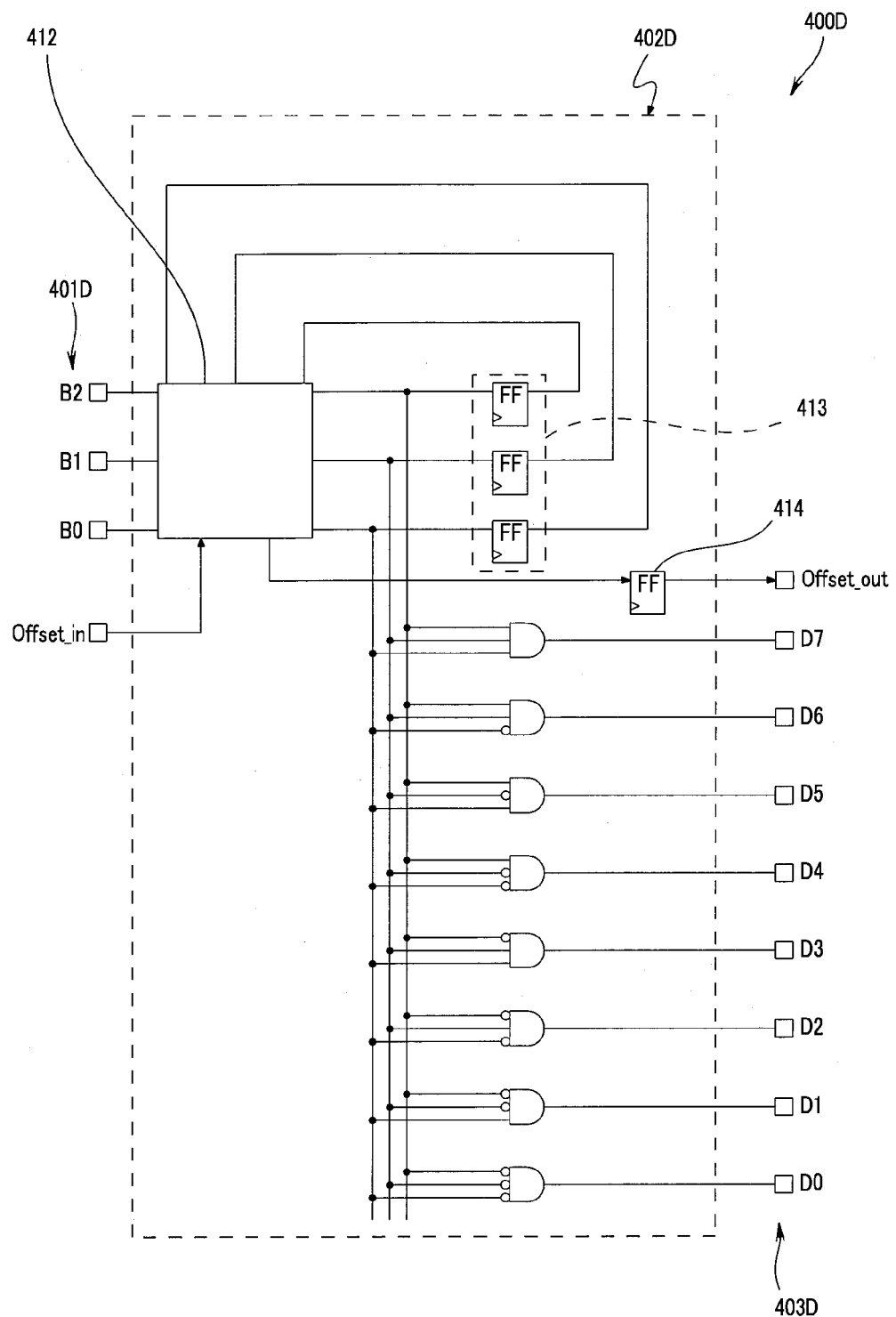
FIG. 26 is a circuit diagram showing a fourth modification of the decoder according to the first and second embodiments of the present invention.

FIG. 26 is a circuit diagram showing a fourth modification of the decoder. A decoder 400D in FIG. 26 is a decoder circuit having functions of holding a previous input and of converting the previous state into a state unrelated to the previous state. The decoder 400D has an offset input terminal (Offset_in) as an offset input, an offset output terminal (Offset_out), and a comparing section 412. An offset input section is configured by the offset input terminal and the comparing section 412. Further, the decoder 400D includes a holding section 413 configured by flip-flop circuits for holding the previous input data, and a holding section 414 configured by a flip-flop circuit for holding an offset value.

When an input data is input, the comparing section 412 outputs the input data to the holding section 413 so that the input data is held in the holding section 413. When the next input data (the present input data) is input, the comparing section 412 reads the previous input data from the holding section 413, and compares the input data (the present input data) with the previous input data. When the previous input data is the same as the input data (the present input data) as a result of the comparison, the comparing section 412 adds the offset value input from the offset input terminal to the input data, and outputs the result to the AND circuit. At the same time, the comparing section 412 outputs the offset value to the offset output terminal.

As a result, when the same input data as the previous input data is input, the input data is decoded into a data offset by the offset value. When making the input data offset at the same time of receiving the input data, the decoder 400D outputs the offset value to the offset output terminal. The output side wiring network of the decoder 400D is capable of receiving the offset value, and performing data processing so as to correct the output data from the decoder 400D by the offset value.

Figure 27:
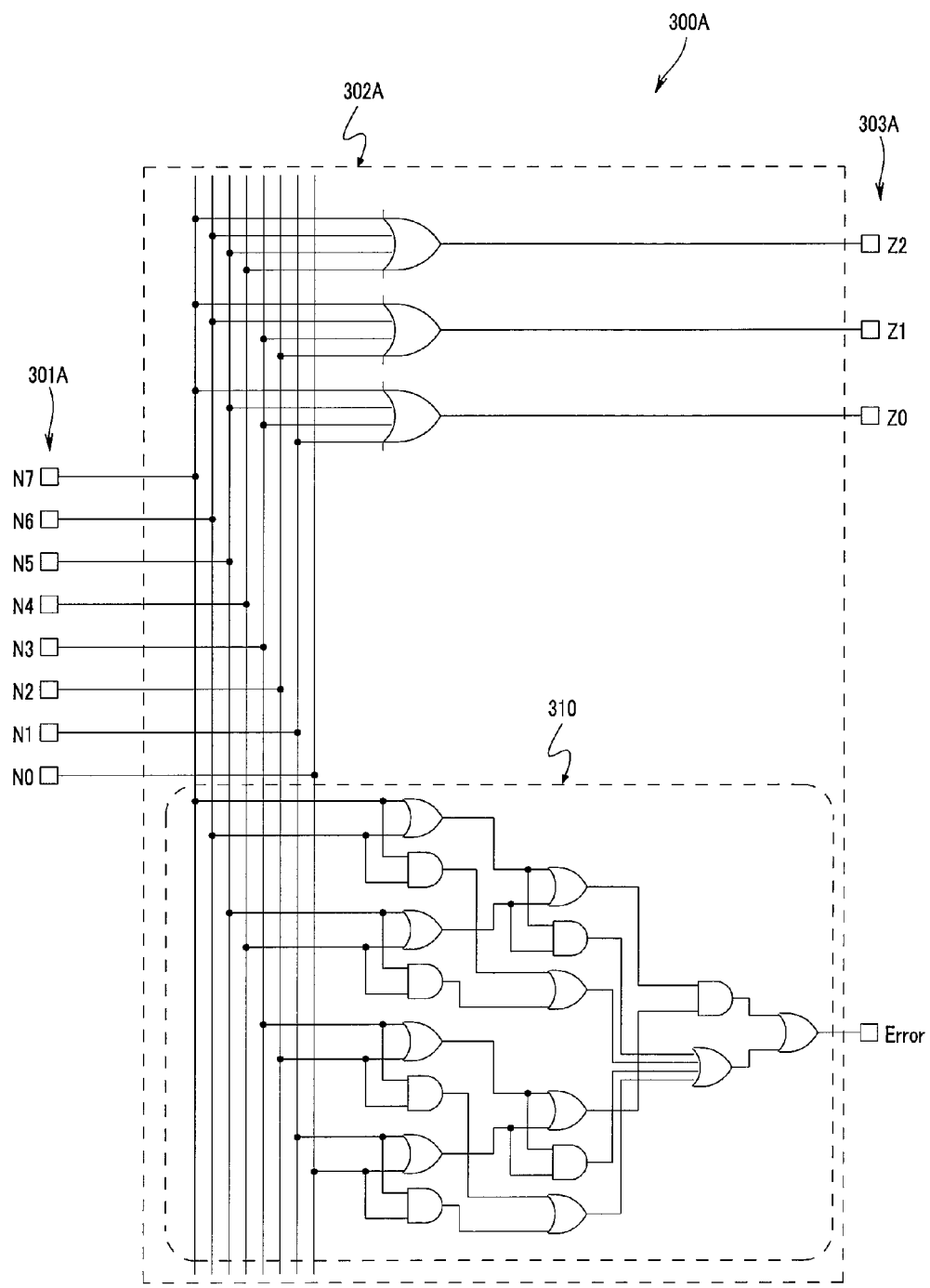
FIG. 27 is a circuit diagram showing a first modification of the encoder according to the first and second embodiments of the present invention.

FIG. 27 is a circuit diagram showing a first modification of the encoder. FIG. 27 shows a configuration example of the encoder having an abnormality detecting function. In an encoder 300A, only one input is usually set to H, that is, becomes active, but two or more inputs may be made active due to a certain abnormality. The encoder 300A shown in FIG. 27 is a configuration example having a function of detecting such abnormality. FIG. 27 shows a case where H is an active state, and an error detecting section 310 which is an error detecting circuit is provided. The error detecting section 310 as an abnormality detecting section has a function of detecting that there are two or more active inputs in the input of the encoder.

The error detecting section 310 shown in FIG. 27 has a circuit configured by connecting, in the shape of a binary tree, OR circuits for taking the logical sum of each two inputs of eight inputs. When the input of such logical sum is normal, two or more of the eight inputs are not simultaneously made active. When detecting that two or more inputs of the logical sum are simultaneously set to H, the error detecting section 310 outputs an abnormal signal (Error) indicating that the abnormality is caused. In this way, it is possible to detect the abnormality in the input data.

Further, in order to detect the abnormality, the error detecting section 310 has a circuit configured by connecting, in the shape of a binary tree, AND circuits for taking logical product of each two inputs, in order to detect whether or not both of each two inputs of the eight inputs are made active. When the output of these AND circuits is set to H, this means that both of the two inputs are set to H, that is, means an abnormal state. It is possible to detect the abnormality by obtaining the logical sum of the outputs of these AND circuits and OR circuits.

Figure 28:
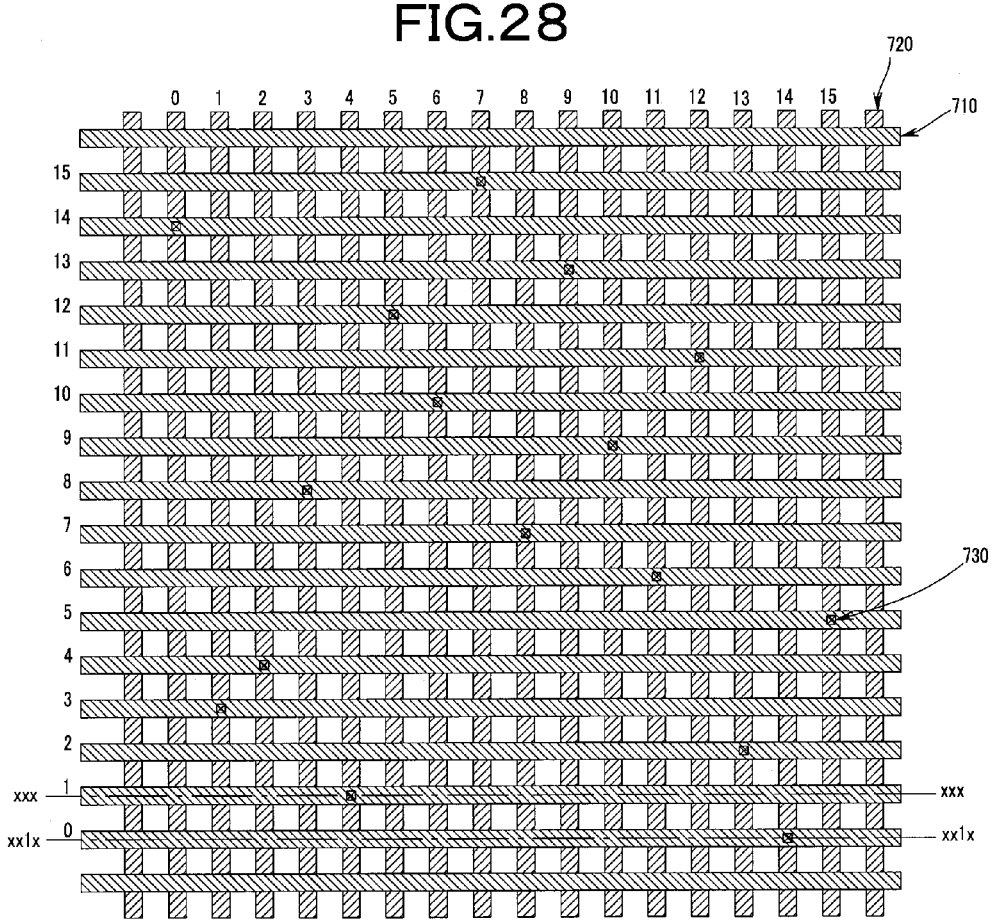
FIG. 28 is a plan view showing an example of the wiring layout of the SBOX of DES according to the first and second embodiments of the present invention.

FIG. 28 is a plan view showing an example of a wiring layout of the SBOX of DES shown in FIG. 7 to FIG. 10. Generally, the power consumption of LSI depends on its load capacitance. The difference in the capacitance of the wiring in the LSI appears as a difference in the power consumption. Thus, in order to suppress the change in the power consumption, it is necessary to make the capacitance of the wirings uniform. When the wiring pattern of the wiring network is realized by the shape as shown in FIG. 7 to FIG. 10, the length of the wiring is made different in dependence upon the destination of the signal, which results in the difference in the wiring capacitance.

Figure 29:
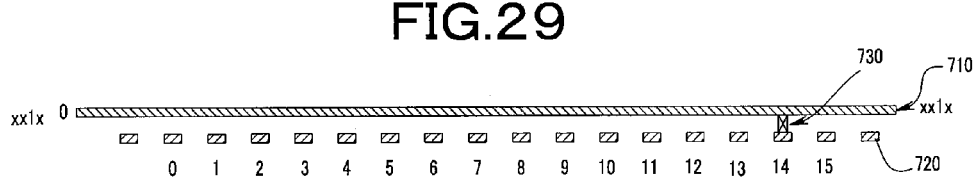
FIG. 29 is a cross-sectional diagram for explaining the cross section along a line XXIX-XXIX in FIG. 28 according to the first and second embodiments of the present invention.
Figure 30:
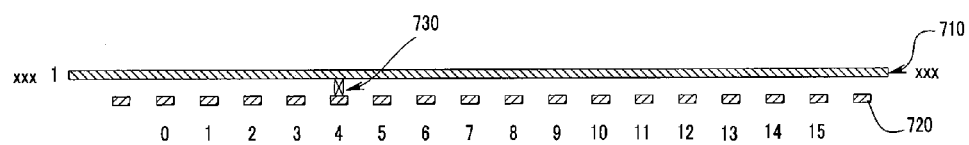
FIG. 30 is a cross-sectional diagram for explaining the cross section along a line XXX-XXX in FIG. 28 according to the first and second embodiments of the present invention.

Thus, in the wiring layout shown in FIG. 28, all of wirings 710 in the lateral direction and wirings 720 in the longitudinal direction have the same length. FIG. 29 is a cross-sectional diagram for explaining the cross section along a line XXIX-XXIX in FIG. 28. FIG. 30 is a cross-sectional diagram for explaining the cross section along a line XXX-XXX in FIG. 28.

Specifically, the wiring network has a plurality of wiring patterns extending in the longitudinal direction and the lateral direction, respectively. In the plurality of wiring patterns 710 and 720, in order to replace bit positions of plurality of bit data, the intersection points of the wirings corresponding to the input side terminal and the wirings corresponding to the output side terminal are electrically connected by contacts 730, as shown in FIG. 29 and FIG. 30. Further, dummy wirings are arranged on the outside of the necessary wirings (0 to 15). The wiring in the longitudinal direction and the wiring in the lateral direction are connected to each other by the contact 730. FIG. 28 is a wiring layout corresponding to FIG. 7. In FIG. 28, the plurality of wirings extending in the lateral direction are connected to the input (decoder 4), and the plurality of wirings extending in the longitudinal direction are connected to the output (encoder 3). The wiring is equivalent to the wiring of S1-0 in FIG. 7. In the wiring layout shown in FIG. 28, since all the wirings have the same length and the dummy wirings are arranged at the both sides of the necessary wirings, it is possible to make all of the capacitance between the wiring and the substrate and of the capacitance between wirings equal to each other. By using such a wiring layout, it is possible to make all the wiring capacitance equal to each other for all the wirings, as a result, it is possible to reduce the variation in the power consumption due to the data.

Note that in the above description, the number of signals set to H by the decoder is one, but if the change in the power consumption is suppressed, the encryption processing circuit may be configured so that a plurality of signals are set to H, that is, the hamming weight is set to a predetermined value of two or more.

As described above, when the encryption processing circuit according to each of the embodiments and modifications as described above is used, only a predetermined number of signals set to H are processed in the wiring network, and hence the power consumption does not depend on the input data. Therefore, it is possible to realize an encryption processing circuit and an encryption processing method having resistance to a so-called power analysis attack.

The present invention is not limited to the above described embodiments, and various modification, changes or the like, are possible within the scope and spirit of the invention.

What is claimed is:

1. An encryption processing circuit configured to perform predetermined encryption computing, comprising:
    a decoder used for the predetermined encryption computing and configured to convert a binary input data subjected to data masking based on a first mask data into a first plurality of bit data of a constant hamming weight, regardless independently of a hamming weight of the input data and to output the first plurality of bit data as parallel data;
    a mask removing section connected to the decoder and configured to perform removing processing of the first mask data to the first plurality of bit data output by the decoder;
    a wiring network connected to the mask removing section and configured to receive the first plurality of bit data subjected to the mask removing processing by the mask removing section, the wiring network further configured, for the purpose of the predetermined encryption computing, to change a bit pattern of the received first plurality of bit data subjected to the mask removing processing by replacing bit positions of the first plurality of bit data subjected to the mask removing processing, and to generate a change bit data as parallel data;
    a mask adding section connected to the wiring network and configured to generate a second plurality of bit data by performing second mask data adding processing to the change bit data by using the second mask data; and
    an encoder connected to the mask adding section and configured to convert the second plurality of bit data into a binary output data,
    wherein the mask removing section is configured by a wiring network for mask processing, the wiring network connected to the decoder and configured to receive the first plurality of bit data, the wiring network further configured to change a bit pattern of the received first plurality of bit data by replacing bit positions of the first plurality of bit data, and to generate the first plurality of bit data subjected to the mask removing processing,
    wherein at least one of data masking by the first mask data and data masking by the second mask data is a data masking based on exclusive OR processing,
    wherein the wiring network for mask processing includes a plurality of selection circuits configured to change a state where two signals input into two input terminals respectively appear in two output terminals, according to a control input input into a control input terminal, and
    wherein outputs of the plurality of selection circuits, into which the plurality of first bit data are input, are changed by respectively inputting the first mask data as the control input into each of the control input terminals of the plurality of selection circuits, thereby replacing bit positions of the first plurality of bit data in the wiring network for mask processing.

2. An encryption processing circuit configured to perform predetermined encryption computing, comprising:
    a decoder used for the predetermined encryption computing and configured to convert a binary input data subjected to data masking based on a first mask data into a first plurality of bit data of a constant hamming weight, regardless independently of a hamming weight of the input data and to output the first plurality of bit data as parallel data;
    a mask removing section connected to the decoder and configured to perform removing processing of the first mask data to the first plurality of bit data output by the decoder;
    a wiring network connected to the mask removing section and configured to receive the first plurality of bit data subjected to the mask removing processing by the mask removing section, the wiring network further configured, for the purpose of the predetermined encryption computing, to change a bit pattern of the received first plurality of bit data subjected to the mask removing processing by replacing bit positions of the first plurality of bit data subjected to the mask removing processing, and to generate a change bit data as parallel data;
    a mask adding section connected to the wiring network and configured to generate a second plurality of bit data by performing second mask data adding processing to the change bit data by using the second mask data; and
    an encoder connected to the mask adding section and configured to convert the second plurality of bit data into a binary output data, wherein the mask removing section is configured by a wiring network for mask processing, the wiring network connected to the decoder and configured to receive the first plurality of bit data, the wiring network further configured to change a bit pattern of the received first plurality of bit data by replacing bit positions of the first plurality of bit data and to generate the first plurality of bit data subjected to the mask removing processing, wherein at least one of data masking by the first mask data and data masking by the second mask data is a data masking by remainder adding processing, wherein the wiring network for mask processing includes a plurality of selection circuits, each configured to output either one of two signals input into two input terminals to an output terminal, according to a control input input into a control input terminal, and wherein outputs of the plurality of selection circuits, into which the plurality of first bit data are input, are changed by inputting the first mask data as the control input into each of the control input terminals of the plurality of selection circuits, thereby replacing bit positions of the first plurality of bit data in the wiring network for mask processing.

3. An encryption processing circuit configured to perform predetermined encryption computing, comprising:

a decoder used for the predetermined encryption computing and configured to convert a binary input data subjected to data masking based on a first mask data into a first plurality of bit data of a constant hamming weight, regardless independently of a hamming weight of the input data and to output the first plurality of bit data as parallel data;

a mask removing section connected to the decoder and configured to perform removing processing of the first mask data to the first plurality of bit data output by the decoder;

a wiring network connected to the mask removing section and configured to receive the first plurality of bit data subjected to the mask removing processing by the mask removing section, the wiring network further configured, for the purpose of the predetermined encryption computing, to change a bit pattern of the received first plurality of bit data subjected to the mask removing processing by replacing bit positions of the first plurality of bit data subjected to the mask removing processing, and to generate a change bit data as parallel data;

a mask adding section connected to the wiring network and configured to generate a second plurality of bit data by performing second mask data adding processing to the change bit data by using the second mask data; and an encoder connected to the mask adding section and configured to convert the second plurality of bit data into a binary output data, wherein the mask removing section is configured by a wiring network for mask processing, the wiring network connected to the decoder and configured to receive the first plurality of bit data, the wiring network further configured to change a bit pattern of the received first plurality of bit data by replacing bit positions of the first plurality of bit data, and to generate the first plurality of bit data subjected to the mask removing processing, wherein at least one of data masking by the first mask data and data masking by the second mask data is a data masking by remainder adding processing, wherein the wiring network for mask processing includes a plurality of connection elements, each configured to change connection and disconnection states between two terminals according to a control input input into a control input terminal, and wherein the first plurality of bit data are respectively input into one terminal of the plurality of connection elements, the plurality of output terminals of the wiring network are respectively connected to the other terminal of the plurality of connection elements, and the first mask data are input as the control input into each of the control input terminals of the plurality of connection elements, whereby replacement of bit positions of the first plurality of bit data in the wiring network for mask is performed.

* * * * *